United States Patent [19]

Yoshinobu et al.

[11] Patent Number: 5,721,584
[45] Date of Patent: Feb. 24, 1998

[54] TWO-WAY BROADCAST SYSTEM AND RECEIVING SYSTEM

[75] Inventors: Hitoshi Yoshinobu, Kanagawa; Yoshitsugu Hattori, Tokyo, both of Japan

[73] Assignee: Sony Corporation, Tokyo, Japan

[21] Appl. No.: 470,396

[22] Filed: Jun. 6, 1995

[30] Foreign Application Priority Data

Jul. 22, 1994 [JP] Japan .................. 6-191885

[51] Int. Cl.⁶ ...................... H04N 7/00; H04N 7/10
[52] U.S. Cl. .................. 348/13; 348/1; 348/12; 455/5.1
[58] Field of Search ............... 348/1, 2, 3, 4, 348/13, 6, 7, 10, 12; 455/4.1, 5.1; H04N 7/00, 7/10

[56] References Cited

U.S. PATENT DOCUMENTS

| | | | |
|---|---|---|---|
| 4,329,684 | 5/1982 | Monteath et al. | 340/707 |
| 4,390,901 | 6/1983 | Keiser | 358/147 |
| 4,451,701 | 5/1984 | Bending | 179/21 TV |
| 4,488,179 | 12/1984 | Kruger et al. | 358/181 |
| 4,618,995 | 10/1986 | Kemp | 455/2 |
| 4,635,121 | 1/1987 | Hoffman et al. | 358/188 |
| 4,706,121 | 11/1987 | Young | 358/142 |
| 4,829,558 | 5/1989 | Welsh | 372/92 |
| 4,847,886 | 7/1989 | Chumley | 379/56 |
| 5,077,607 | 12/1991 | Johnson et al. | 358/84 |
| 5,151,789 | 9/1992 | Young | 358/194.1 |
| 5,191,410 | 3/1993 | McCalley et al. | 358/86 |
| 5,243,588 | 9/1993 | Maeda et al. | 369/54 |
| 5,457,807 | 10/1995 | Weinblatt | 455/2 |
| 5,473,673 | 12/1995 | Van Wijk et al. | 379/92 |

*Primary Examiner*—John K. Peng
*Assistant Examiner*—Linus H. Lo
*Attorney, Agent, or Firm*—Harold T. Fujii; Jerry A. Miller

[57] ABSTRACT

A two-way broadcasting system and a receiving system which can be realized at a low cost and is not required to newly connect the connecting cables and extended wiring layout. A multiplexed broadcast signal is transmitted from the broadcasting side under the condition that the two-way broadcast program information can be separated from the principal audio signal of the broadcast program and the two-way broadcast program information can be reproduced as the audible sound in the receiving side. In the receiving side, such broadcast signal is received and the reproduced voice signal including the two-way broadcast program information is reproduced from a loud speaker system. The two-way broadcast program information is extracted from the collected voice signal and is then decoded in a decoding means. Using this decoded information, the response information to the two-way broadcast program can be transmitted to the predetermined response sending destination through the communication line.

17 Claims, 16 Drawing Sheets

Low Group Frequency (Hz): 697, 770, 852, 941
High Group Frequency (Hz): 1209, 1336, 1477, 1633

Specifications of the DTMF Signals
on the Telephone Line

| Item | Allowable Range |
|---|---|
| Signal Sending Time | 50 ms or Longer |
| Minimum Pause (Minimum Value of Pause Between Adjacent Signals) | 30 ms or Longer |
| Period (Signal Sending Time + Minimum Pause) | 120 ms or Longer |

TWO-WAY BROADCAST SYSTEM AND RECEIVING SYSTEM

The disclosure of patent application Ser. No. 08/469,331, filed Jun. 6, 1995, entitled PROGRAM INFORMATION BROADCASTING SYSTEM, PROGRAM INFORMATION DISPLAY METHOD, AND RECEIVING DEVICE, Attorney Docket No. 50J1263, assigned to Sony Corporation, inventors being Hitoshi Yoshinobu, Tsukasa Yoshimura and Yoshitsugu Hattori is hereby incorporated by reference.

FIELD OF THE INVENTION

The present invention relates to a two-way broadcast system and receiving system offering a multiplexed broadcast signal of information relative to a two-way broadcast program and sending a response, from the receiving side, to the two-way program by utilizing the information explained above.

BACKGROUND OF THE INVENTION

Many audience participation type programs such as quiz, shopping and research programs are currently broadcasted from broadcasting stations. In these broadcast programs, audiences are requested to send their responses to the questions issued in the programs and therefore audiences are trying to send responses back to the broadcasting stations utilizing, for example, telephone sets or facsimile transmitter/receiver.

In the case of such audience participation type programs, information such as the telephone number which is required for sending the response has usually been presented by images or announcements while the program is broadcasted. For instance, in the case of television broadcast, the telephone number for sending the response is displayed on the display screen for the predetermined period using a superimpose or is presented in the form of announcement by a performer of the program. Meanwhile, in the radio broadcast, the similar programs are also often broadcasted.

In such a case, audiences who are trying to send the response must memorize or note, for example, the telephone number for sending the response which has been displayed on the screen or offered in the form of announcement. Otherwise, in the case of a television receiver having the so-called still function to provide a still image of display, audiences can display a still image containing the telephone number for sending the response on the television receiver and thereby they can note such telephone number or dial the number in direct.

Moreover, the two-way broadcast which has further advanced from the conventional audience participation type broadcast programs has been proposed.

In this two-way broadcast system, information relative to the two-way broadcast programs such as the telephone number for sending the response is multiplexed in the broadcast signal for transmission to the receiving side by superimposing such signal like the character broadcast program data, for example, within the predetermined vacant horizontal section in the vertical blanking period of a video signal. In this case, only the information relative to the two-way broadcast program is extracted from the received broadcast signal in the receiving side and this extracted information may be used for sending the response by decoding it for temporary storage in the memory. For instance, sending of the response to the two-way broadcast program can be made accurately by automatically dialing the telephone number for sending the response extracted by the decoding process. Therefore, audiences can be freed from memorization or noting of the information relative to the two-way broadcast program, for example, the telephone number for sending the response.

However, in the case of an audience participation type broadcast program for collecting the responses from audiences using telephone sets or facsimile transmitter/receiver as explained above, the information such as the telephone number for sending the response is usually broadcasted only for a very short period. Thereby, some in the audience cannot completely note the telephone number for sending the response or cannot accurately note the telephone number because of time restrictions.

Furthermore, some in the audience cannot note the telephone number for sending the response because a memo pad and a writing tool are not available. Moreover, it may also be possible that display of the telephone number of the response sending destination is ended before the still function is activated in the television receiver providing the still display function.

As described, if audiences cannot accurately recognize the telephone number of the response sending destination, it may be involved in generation of wrong telephone calls.

From this point of view, according to the aforementioned multiplexing system, the information relative to the two-way broadcast program can be surely extracted accurately from the broadcast signal. However, a problem rises here that a receiver provided with a decode circuit for multiplexed information is necessary. In this case, this receiver is very expensive because different decode circuits are required depending on the broadcast system such as NTSC, BS, CS, MUSE and AM/FM radio broadcast. It is a large share for audiences to prepare such an expensive receiver for two-way broadcast.

Moreover, the receiving side is also required to install, as well as the receiver comprising the decode circuit mentioned above, a communication apparatus for sending a response information to the broadcasting side through the telephone line on the basis of the information relative to a two-way broadcast program which has been decoded by the decode circuit of the receiver. This communication apparatus may be comprised within the receiver or may be installed independent of the receiver.

When the communication apparatus is comprised within the receiver, the telephone line must be connected to the receiver, resulting in a problem that the telephone line has to be extended and laid in a wider area.

Therefore, it can be considered to install the communication apparatus in separation from the receiver. Even in this case, since the communication apparatus must be connected with the receiver in order to receive the telephone number of the response sending destination which is a piece of information relative to the two-way broadcast program decoded by the decode circuit of the receiver, cables for connecting between the receiver and communication apparatus are also necessary. For this purpose, as in the case where the communication apparatus is comprised in the receiver, wirings are complicated and when the communication apparatus is arranged in separation from the receiver, the cables connecting these communication apparatus and receiver must be extended and laid in a wider area.

As described above, even when the communication apparatus is comprised in the receiver or installed in separation from the receiver, the telephone line or connecting cable must be wired, making it difficult to simply enjoy the two-way broadcast program. Moreover, if telephone line and connecting cable are laid imprudently, a user may cause a problem by catching the cable with his leg.

It is therefore an object of the present invention to provide a two-way broadcast system and receiving system which can eliminate the problems explained above.

SUMMARY OF THE INVENTION

In regard to the means for solving the aforementioned problems, the two-way broadcast system and receiving system of the present invention will be explained in correspondence to the reference numerals and symbols appearing in the preferred embodiments described later.

Information relative to a two-way broadcast program is multiplexed into a principal audio signal and is then transmitted from the broadcasting side.

In the receiving side, a broadcast program receiving and reproducing means 10 and two-way response sending devices 20, 30 which is installed in separation from the broadcast program receiving and reproducing means 10 and is connected with a communication line 30L are respectively provided.

The two-way response sending devices 20 and 30 comprise a sound collecting means 21 for collecting the sound from a loud speaker 11 of the broadcast program receiving and reproducing means 10 and a decode means 22 for extracting the information relative to a two-way broadcast program from an output speech signal of the sound collecting means 21. Moreover, a transmitting means is also provided to send a response information of a two-way broadcast program through the communication line 30L by utilizing the information relative to a two-way broadcast program decoded by the decode means 22.

The broadcast program receiving and reproducing means 10 reproduces, upon reception of the broadcast signal formed by multiplexing the information relative to a two-way broadcast program into the main audio signal, the relevant broadcast program as the service for audiences. In this case, the information relative to a two-way broadcast program is reproduced as the audible sound from the speaker 11 of the broadcast program receiving and reproducing means 10.

The sound collecting means 21 of the two-way response sending devices 20 and 30 collects the audible sound to supply it to the decode means 22. The decode means 22 extracts the information relative to a two-way broadcast program from the supplied sound signal and then decodes only the extracted information.

The transmitting means 36 is controlled on the basis of the decoded information relative to the two-way broadcast program to transmit a response information generated by a user to the predetermined response sending destination such as the broadcasting side through the communication line 30L.

According to the present invention as configured as explained above, the information relative to the two-way broadcast program can easily and accurately recognized with the two-way response sending devices 20, 30. Moreover, the transmitting means 30 is controlled on the basis of such recognized information to surely transmit the response information to the broadcasting station side.

Since the information relative to a two-way broadcast program is served as the audible sound to the two-way response sending devices 20, 30 from the broadcast program receiving and reproducing means 10, it is no longer necessary to connect the receiving and reproducing means 10 and two-way response sending devices 20, 30 with cables.

As explained above, the present invention offers the information relative to the two-way broadcast program as an audible sound and thereby implements a receiving system to receive the two-way broadcast by use of the existing television receiver or radio receiver which can receive the current broadcast signals without any modification. As a result, the present invention can provide a receiving system for receiving two-way broadcast programs without causing excessive share on users.

According to one aspect of the receiving system of the present invention, a two-way broadcast receiving system can be realized without any additional wiring of the connecting cables because the information relative to the two-way broadcast programs is served as the audible sound and thereby such information relative to the two-way broadcast programs can be received on the basis of wireless system. According to another aspect of the receiving system of the present invention, the information relative to the two-way broadcast programs such as the telephone number of the broadcasting station side for making access thereto can be received and recognized accurately without depending on uncertain method such as noting or memorization and thereby a reliable response information can be returned. Moreover, a wrong telephone call can also be prevented at the time of transmitting the response information.

According to further aspect of the two-way broadcast system of the present invention, it is possible to receive the two-way broadcast programs of any kind of broadcast system such as NTSC, BS, CS, MUSE and AM/FM radio broadcasts without change of the receiving system for the broadcast system. In addition, even if a new broadcast system may be developed and employed in future, when such system is of the type of reproducing an audio signal as the audible sound, the two-way broadcast system and the receiving system ensuring the compatibility in future can be provided without any modification of the receiving system of the present invention.

Moreover, according to still further aspect of the receiving system of the present invention, a low cost receiving system can be configurated because if the signal multiplexed in the principal audio signal is the DTMF signal, a general purpose DTMF decoder may be used as the DTMF decoder in the receiving side.

DETAILED DESCRIPTION OF THE PREFERRED EMBODIMENTS

A preferred embodiment of a two-way broadcast system and receiving system according to the present invention will be explained hereunder. In this embodiment, information to be multiplexed in the principal audio signal is multiplexed as a DTMF (Dual Tone Multi-Frequency) signal.

The DTMF signal will be explained with reference to FIG. 3. The DTMF signaling system is an audio frequency band signaling system for simultaneously sending dual tones of a low frequency group (low group) and a high frequency group (high group). Each of these low frequency and high frequency groups is composed of the tones of four audio frequency bands in which any two frequency bands are not in the relationship of the articulation.

In the DTMF signal, four frequencies of the low group are selected, for example, to 697 Hz, 770 Hz, 852 Hz and 941 Hz, while four frequencies of high group are selected to 1209 Hz, 1336 Hz, 1477 Hz and 1633 Hz. Each one frequency of the low group is combined with each one frequency of the high group and each DTMF signal consisting of each combination of the frequencies of the low and high groups (each DTMF signal is respectively called a function signal) is assigned, as illustrated in FIG. 3, to the push buttons "0" to "D" arranged as the matrix consisting of four rows and four columns.

For the communication by telephone system, only 12 function signals among the 16 combinations of the DTMF signals are generally used as the subscriber address (telephone number) signals. That is, the function signals formed of 12 combinations of the DTMF signals correspond to the numerals from "0" to "9" used as the so-called ten keys of the telephone set and the symbols "*" and "#". The function signals corresponding to "A", "B", "C", "D" are not generally used in Japan and are used only for data transmission utilizing the push-button (PB) dial.

Figures 3, 4:
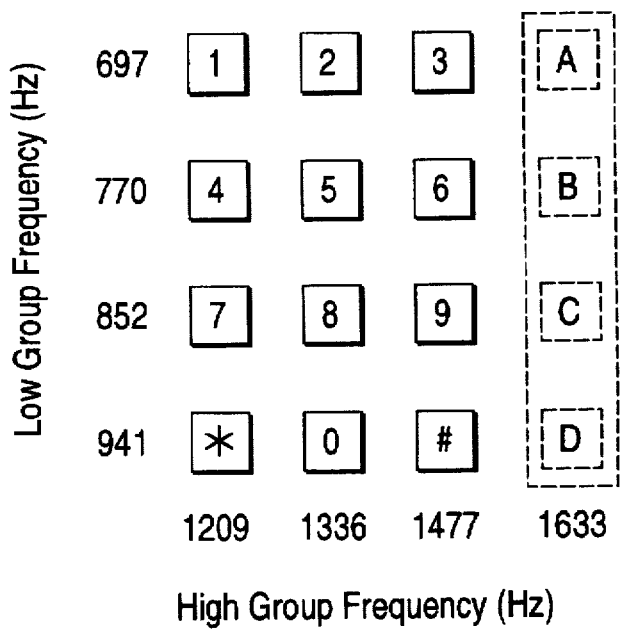
FIG. 3 is a diagram for explaining a Dual Tone Multi-Frequency (DTMF) signal.
FIG. 4 is a table for explaining the DTMF signal transmitting conditions.

In the case of selecting the line based on the telephone number using such DTMF signals, the signal transmitting conditions are specified as shown in FIG. 4.

With the combination of two kinds of frequencies explained above and the signal transmitting conditions shown in FIG. 4, the DTMF signal has a frequency which is rarely generated in the natural world and can be clearly discriminated from natural sound such as a person's voice. Therefore, such DTMF signal can be multiplexed in an ordinary broadcast audio signal and can also be separated easily in the receiving side.

For instance, these DTMF signals are also used in a multiple-function telephone system and therefore a DTMF decoder which can extract the DTMF signals from a speech signal for the purpose of decoding is widely spread and can be obtained at a comparatively low price.

The multiplexing of information relative to two-way broadcast programs will now be described. In the transmitting side, namely in the broadcast station side in this embodiment, at the time of forming the information relative to the two-way broadcast program as a subbroadcast signal, the function signals "A", "B" and "C" are used as transmission start signals for the information relative to the two-way broadcast program, while the function signal "D" is used as a transmission end signal among the function signals corresponding to "A", "B", "C", "D" is not used for PB line selection as explained above.

Since three kinds of transmission start signals are prepared, the information relative to three kinds of two-way broadcast programs can be individually transmitted in this embodiment. That is, the information relative to three kinds of two-way broadcast programs is transmitted with partition using any one of the function signals of "A", "B", "C" and the function signal "D".

For example, the information relative to responsive access to a two-way broadcast program, namely the information such as telephone number of the response sending destination (the acceptance telephone number) and transmission rate is transmitted between the function signal "A" as the transmission start information and the function signal "D" as the transmission end information. Moreover, in the same manner, the information relative to the setting of an environment, such as limitation of the last digit of the telephone number and setting of the current time for the responding side is multiplexed as the signal transmitted between the function signals "B" and "D", while the information relative to clearing the receiving data is multiplexed as the signal transmitted between the functions signals "C" and "D".

In the receiving side, the numeral and symbol data sandwiched between any one of the function signals "A", "B", "C" as the transmission start information and the function signal "D" as the transmission end information are considered as a data stream (information group) relative to the two-way broadcast program and is then stored, as will be described later, in the predetermined storage area of the memory.

For example, in the case of permitting a receiver of an interactive television specification version 00 to make an access with an acceptance telephone number 0990-1234-1234 in the transmission rate of 3000 bps, the two-way broadcast program information, as the subbroadcast information, is multiplexed in the principal broadcast audio signal for transmission under the condition that a data stream such as 00#0990*1234*1234 formed of each function signal of the DTMF signals is sandwiched between the function signals "A" and "D". Here, the first two digits 00 of the data stream means that the interactive television specification version is 00 (transmission rate is 300 bps) and the numerical data after the symbol "#" means the acceptance telephone number.

In the case of permitting a receiver of an interactive television specification version 01 to make an access with an acceptance telephone number 0990-1234-1235 in the transmission rate of 1200 bps, a data stream such as 01#0990*1234*1234 formed of each function signal of the DTMF signals is multiplexed for transmission under the condition that it is sandwiched between the function signals "A" and "D". Here, the first two digits 01 of this data stream means that the interactive television specification version is 01 (transmission rate is 1200 bps) and the numerical data after the symbol "#" means the acceptance telephone number.

In the data stream relative to responsive access indicated above, a symbol "#" means a separator (partition of individual data) and a symbol "*" means a pause.

In the case of limiting the access only to the audiences having particular telephone numbers (subscriber number) as the information relative to setting of environment, for example, in the case of limiting access only to audiences having the telephone numbers including 0 in the last digit, a data stream such as 0#0 formed of each function signal of the DTMF signals is multiplexed in the principal broadcast audio signal for transmission under the condition that it is sandwiched between the function signals "B" and "D", while in the case of limiting access only to audiences having the telephone number including 1 in the last digit, a data stream such as 0#1 formed of each function signal of the DTMF signals is multiplexed for transmission also under the condition that it is sandwiched between the function signals "B" and "D", respectively. In this case, the numeral "0" before the symbol "#" means that an access from the telephone number including the numeral next to the symbol "#" as the last digit is permitted.

For permitting access only to the telephone number including an even number in the last digit, a data stream such as 0#0*0#2*0#4*0#6*0#8 formed of each function signal of the DTMF signals is multiplexed in the principal broadcast audio signal for transmission under the condition that it is sandwiched between the function signals "B" and "D". Here, the symbol "*" means logical sum, OR.

For example, at the time of clearing the number limitation, a data stream such as 99#0, formed of each function signal of the DTMF signals, is sandwiched between the function signals "C" and "D" for transmission as the information relative to clearing of the receiving data, and in the case of clearing the acceptance telephone number, a data stream such as 99#1, formed of each function signal of the DTMF signals, is sandwiched between the function signals "C" and "D" for transmission.

As described above, since the function signals "A", "B", "C", "D," which are not used as the signal for selecting the telephone line, are used as the transmission start and end signals for the information relative to the two-way broadcast program, these signals are never erroneously detected as information relative to the two-way broadcast program even if the DTMF signal is originated, for example, in the scene of originating a telephone call in the drama. Moreover, the information relative to two-way broadcast program can be transmitted reliably.

The two-way broadcast system and receiving system according to a present invention will be explained hereunder with reference to the accompanying drawings.

Figure 1:
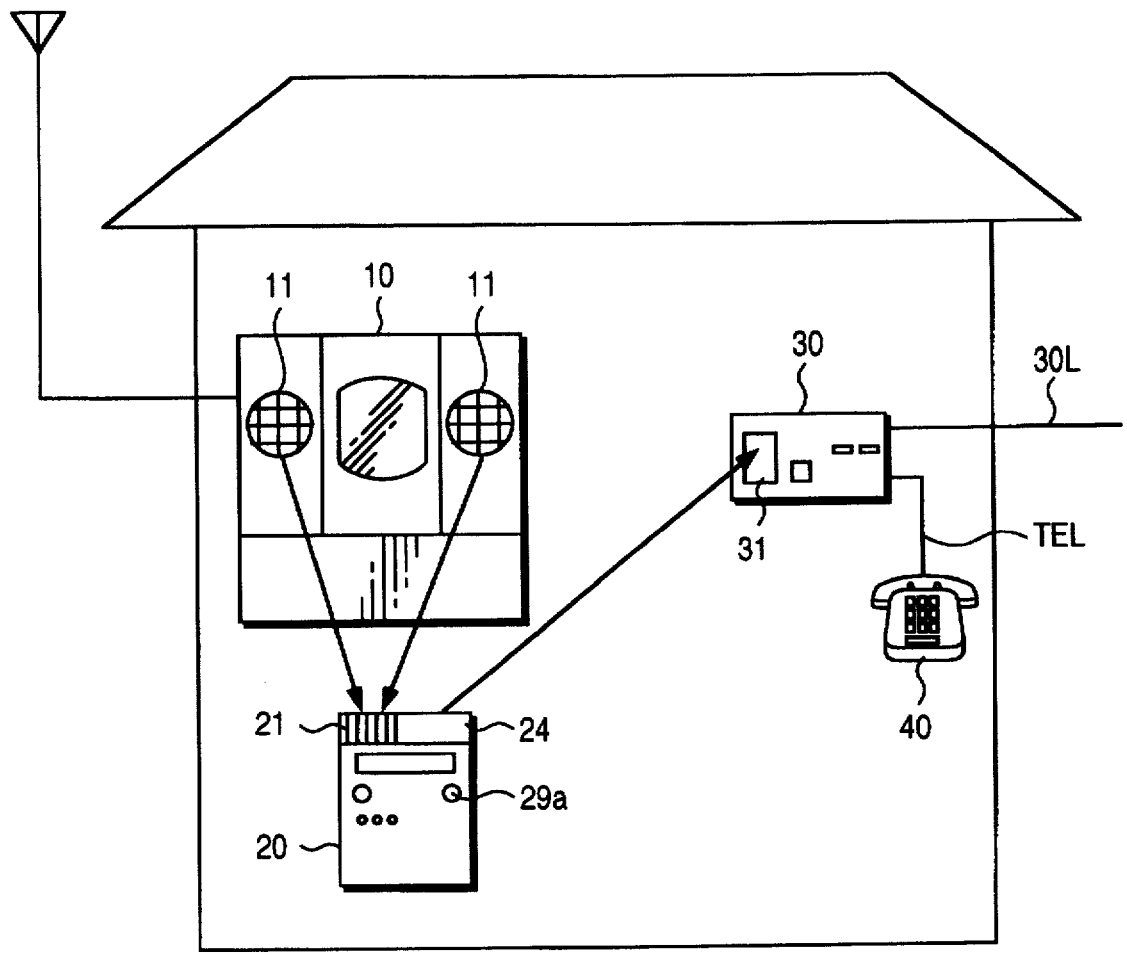
FIG. 1 is a diagram illustrating a structure of a preferred embodiment of the receiving system according to the present invention.

FIG. 1 is a schematic diagram illustrating a preferred embodiment of the receiving system according to the present invention. The receiving system of this embodiment is formed of a television receiver 10, a remote control commander 20 and an adapter 30. The remote control commander 20 and adapter 30 operate as a two-way broadcast response sending device.

The television receiver 10 receives the television broadcast signals to offer image and sound of the broadcast program to viewers.

Figure 2:
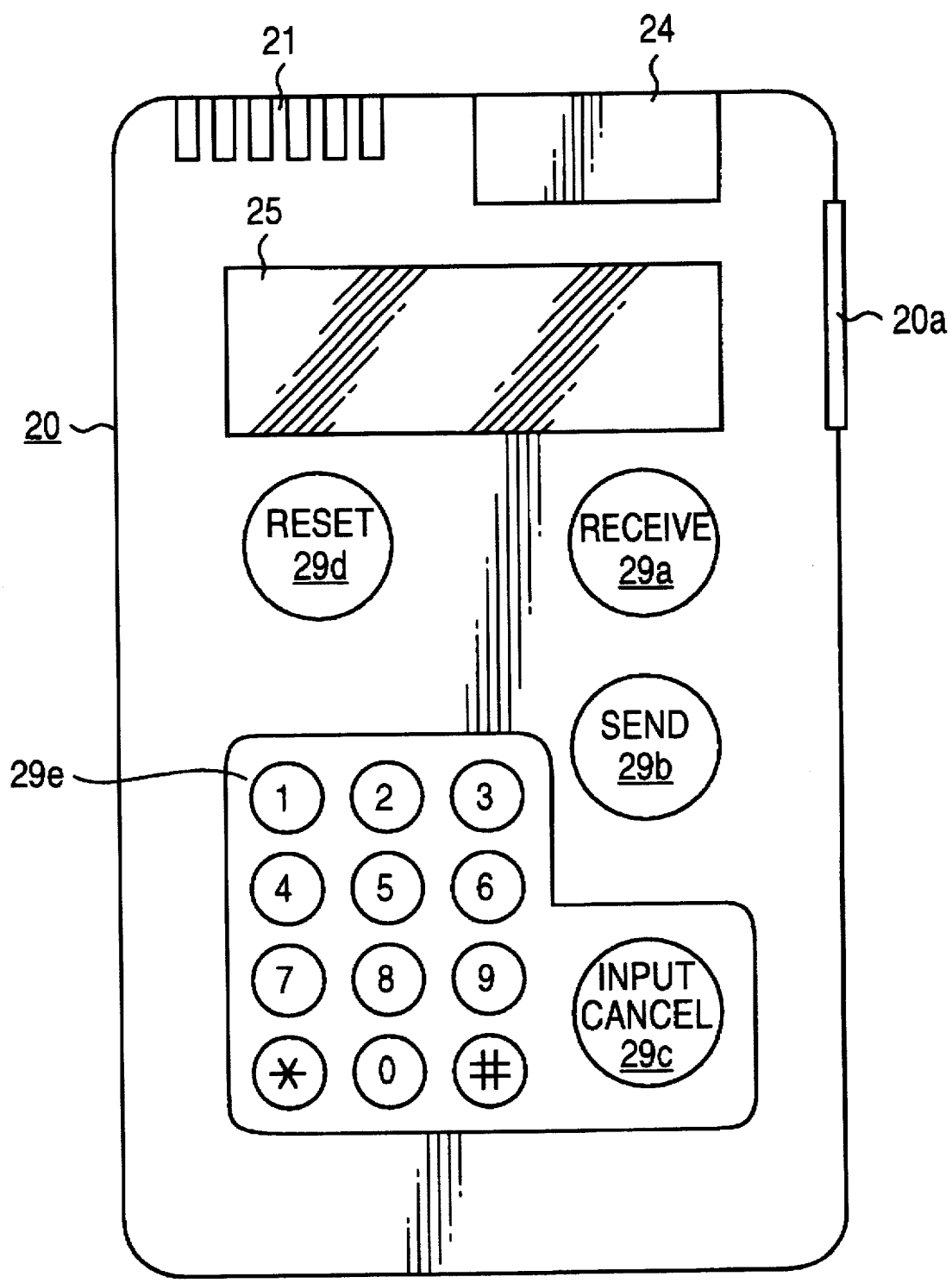
FIG. 2 is an external view of one embodiment of a remote control commander used in the receiving system according to the present invention.

The remote control commander 20 comprises, as illustrated in the external view of FIG. 2, a microphone 21, a remote control signal transmitting part 24, a liquid crystal display LCD 25, function button switches (hereinafter referred only to as buttons) 29a to 29e, and a power supply ON-OFF button switch (hereinafter referred only to as power supply button) 20a.

In the remote control commander 20, the power supply button 20a operates as a switch for controlling the power supply for ON and OFF conditions so that the electrical power is not unnecessarily consumed by the microphone 21 when the remote control commander 20 is inoperated.

Each function button has following function explained hereinafter.

The receive button 29a is used to make the microphone 21 start the sound collecting operation. The send button 29b is operated to make the remote control signal transmitting part 24 start transmission of information formed in the remote control commander 20 as the remote control signal. Response button group 29e is composed of the buttons for inputting numerals from 0 to 9 and symbols * and #. In the explanation of this embodiment, the buttons of 0 to 9, * and # are generally called as the response button 29e. The input cancel button 29c is operated for canceling the input information formed in the remote control commander 20 by depressing the response button 29e. Moreover, the reset button 29d is operated for resetting the remote control commander 20 to the initial condition.

The adapter 30 is connected with the telephone line 30L as illustrated in FIG. 1 and comprises a MODEM for transmitting and receiving data through the telephone line 30L as will be explained later. In addition, the adapter 30 is also provided with an infrared beam receiving part 31 for receiving an infrared remote control signal from the remote control commander 20, enabling the remote control operation of the adapter 30 by means of the remote control commander 20 from a distant area.

As illustrated in FIG. 1, when a broadcast program received by the television receiver 10 is the two-way broadcast program, the information relative to the two-way broadcast program is multiplexed as the DTMF signal in the principal audio signal of the broadcast signal of the two-way broadcast program. Therefore, a reproduced sound of the DTMF signal is outputted with the reproduced sound of the principal audio signal from a loud speaker system 11 of the television receiver 10.

When the power supply button 20a is turned ON and the receive button 29a is depressed, the remote control commander 20 starts to collect the voices outputted from the speaker system 11 using the built-in microphone 21. When the collected voices are detected as the voices of the two-way broadcast program, a built-in DTMF decoder extracts the DTMF signal multiplexed in the principal audio signal as the information relative to the two-way broadcast program and then decodes such extracted information. Thereby, the information relative to the two-way broadcast program can be recognized in the remote control commander 20. Moreover, the response information for the response request offered in the two-way broadcast program reproduced by the television receiver is generated in the remote control commander 20 by operating the response button group 29e.

When the send button 29b is depressed, the remote control commander 20 converts the decoded information, relative to the two-way broadcast program, and the response information for the two-way broadcast program, formed by depressing the response button 29e, into infrared remote control signals and transmits such signals to the adapter 30 from the transmitting part 24.

The adapter 30 receives the infrared remote control signals sent from the remote control commander 20 with the infrared receiving part 31 and then decodes such infrared remote control signals. The decoded infrared remote control signals include, as explained above, the information relative to the two-way broadcast program (hereinafter referred to as two-way broadcast program information) and the response signal for the two-way broadcast program. The adapter 30 automatically dials the telephone number of the response sending destination in the response information included in the two-way broadcast program information in order to send the response information to the broadcasting station through the telephone line 30L.

Further, the adapter 30 is connected with a telephone terminal 40 for common use of the telephone line 30L with both adapter 30 and telephone terminal 40 through the switching control by the NCU (Network Control Unit) comprised in the adapter 30 as will be explained later.

As is apparent from above explanation, any connecting cable is not used for operations of the television receiver 10, remote control commander 20 and adapter 30 and the television receiver 10 and adapter 30 can be installed in any desired positions so long as the remote control commander 20 can be operated as an interface unit between these devices.

Configurations of the remote control commander 20 and adapter 30 described above will then be explained with reference to FIG. 5 and FIG. 6.

Figure 5:
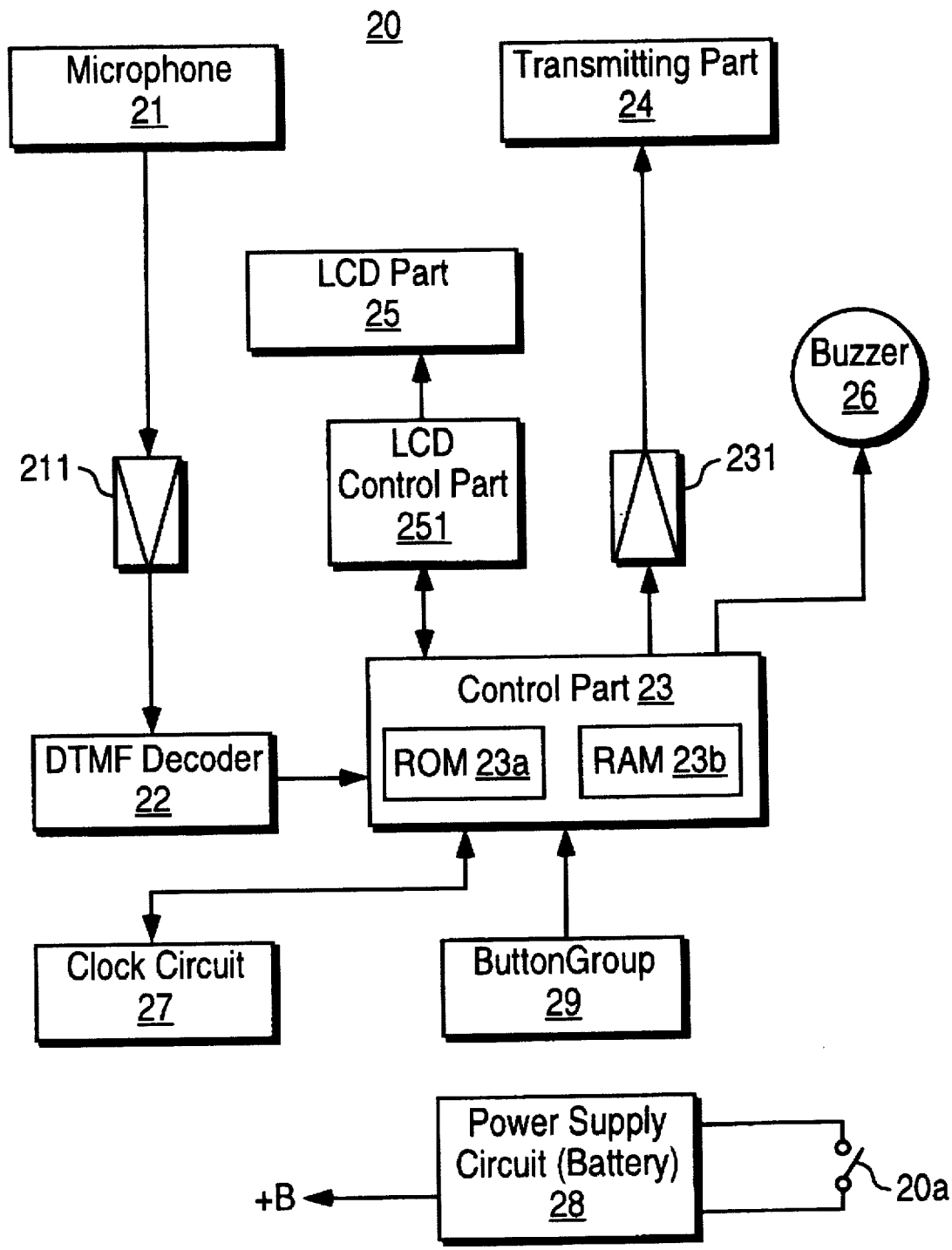
FIG. 5 is a block diagram of one embodiment of the remote control commander used in the receiving system according to the present invention.

FIG. 5 is a block diagram illustrating an embodiment of the remote control commander 20. The remote control commander 20 of this embodiment comprises a microphone 21, a DTMF decoder 22, a control part 23, an infrared remote control signal transmitting part 24, an LCD (Liquid Crystal Display) 25, an LCD control part 251, an alarm buzzer 26, a clock circuit 27 and a power supply circuit 28.

The microphone 21 collects voices when the power supply button 20a of the remote control commander 20 is mined ON and the receive button 29a is being depressed. The collected voices are supplied as a speech signal to the DTMF decoder 22 through an amplifying circuit 211.

The DTMF decoder 22 detects the DTMF signal by detecting, from the speech signals supplied, as already described with reference to FIG. 3, the speech signals of the particular frequencies to be sorted into the low group and high group which are simultaneously transmitted from the broadcasting station side. The detected DTMF signal is decoded to the function signal (0-9, #, *, A-D) determined through combination of the low group and high group frequencies. As for this DTMF decoder 22, those which are widely used and readily commercially available may be used. It would be better, in this case, to provide a filter for extracting only the signal of the frequency band of the DTMF signal in the storage preceding the DTMF decoder 22.

The decoded DTMF signal means the information relative to the two-way broadcast program including, as explained previously in regard to the DTMF signal, the telephone number for sending the response information to the two-way broadcast program, and information limiting the last digit of the audience's telephone number, etc. This two-way broadcast program information is then supplied to the control part 23.

The control part 23 operates to control each circuit and comprises CPU, ROM 23a for storing the fixed data such as programs and display data of the liquid crystal display 25 and RAM 23b used as a work area to store the above-mentioned two-way broadcast program information. In this embodiment, this control part 23 is configurated as a so-called one chip microcomputer.

RAM 23b also stores a response information for the two-way broadcast program. The response information for the two-way broadcast program can be formed, as is explained with reference to FIG. 2, by depressing the response button 29e among the function buttons 29a to 29e forming the button group 29 of FIG. 5.

As described above, the two-way broadcast program information and the response information to the two-way broadcast program stored in the RAM 23b are supplied to the transmitting part 24 through the amplifying circuit 231 when the send button 29b of the button group 29 is depressed. RAM 23b is illustrated as one memory in the figure, but it is actually formed of a plurality of volatile and nonvolatile memories.

The transmitting part 24 is formed of a light emitting diode which outputs the two-way broadcast program information and the response information to the two-way broadcast program stored in the RAM 23b after having converted such information signals into the infrared remote control signal under the control of the control part 23.

LCD (liquid crystal display) 25 displays the response information to the two-way broadcast program which is applied when the response button 29e is depressed, operating condition of the remote control commander 20 and an error message. The LCD control part 251 is controlled by the control part 23 to read characters, figures and icons for liquid crystal display being stored in ROM 23a of the control part 23 and supply to LCD 25 for display.

A buzzer 26 is controlled by the control part 23 to output the buzzer sound. This buzzer is also capable of outputting a melody by changing tone, interval, speed and rhythm in order to inform normal reception or reception failure of the DTMF signal or to inform generation of alarm and error.

A clock circuit 27 has a clock function to store the real time. This clock circuit comprises, for example, an oscillator utilizing a crystal-controlled resonator and a counter for obtaining year, month, day of week, date, hour, minute and second information by dividing the oscillation frequency of the oscillator. As will be described later, this clock circuit 27 also provides the time-up period of the DTMF signal receiving operation.

A battery 28 stores the electrical power to be supplied to each circuit of the remote control commander 20. When the power supply button 20a is mined ON, the battery starts supply of power to each circuit of the remote control commander 20.

A button group 29 is used for inputting user's operation and is composed of the function buttons 29a to 29e as explained above. The button 29 is scanned by the control part 23 to detect depression of the function buttons 29a to 29e. The control part 23 forms a control signal and then supplies this control signal to each circuit in view of starting the operations determined by the function button depressed.

Figure 6:
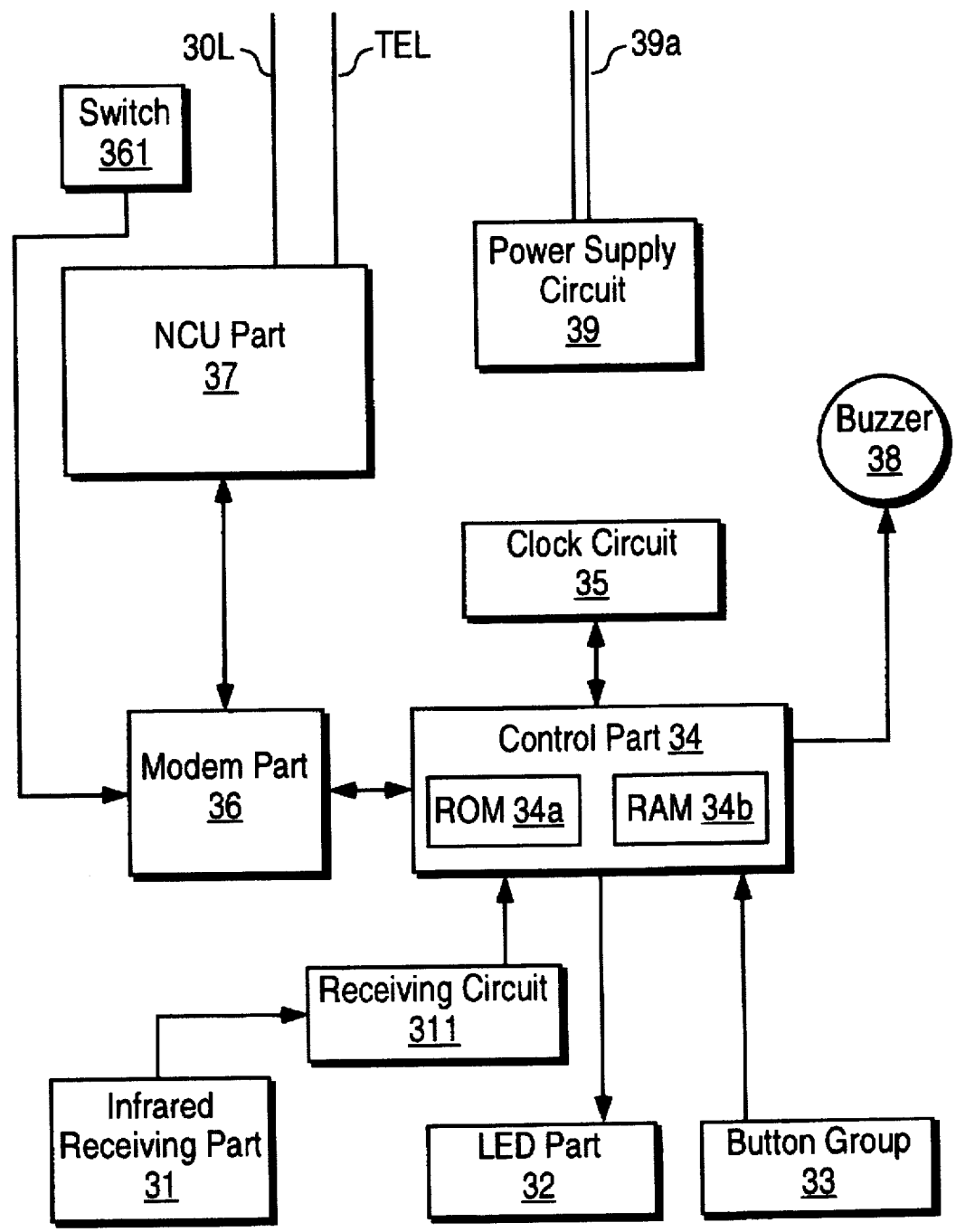
FIG. 6 is a block diagram of one embodiment of an adapter used in the receiving system according to the present invention.

FIG. 6 is a block diagram illustrating an embodiment of the adapter 30. The adapter 30 in this embodiment comprises an infrared receiving part 31, an LED part 32 consisting, for example, of a plurality of LEDs (light emitting diodes), a button group 33, a control part 34, a clock circuit 35, a MODEM part 36, an NCU part 37, an alarm buzzer 38 and a power supply circuit 39. 39a denotes a power supply cable connected to the AC-DC adapter.

A control part 34 controls each circuit and comprises CPU, ROM 34A for storing the fixed data such as programs and adapter identification number and RAM 34b being used as the work area to store the information required for sending the response to the two-way broadcast programs. In this embodiment, the control part 34 is configurated by a so-called one chip microcomputer. In FIG. 6, RAM 34b is illustrated as a memory but it is actually formed of a plurality of volatile and nonvolatile memories.

An LED part 32 indicates conditions of the adapter 30. Namely, the LED part 32 indicates, in this embodiment, the ON-OFF conditions of power switch, existence or not existence of the information to be transmitted in the memory of the control part 34 and generation of error, etc. Respective conditions are indicated in such a manner that the LED corresponding to respective display items is controlled by the control part 34 to light, go out and flicker.

A clock circuit 35 offers the real time like the clock circuit 27 of the remote control commander 20. For instance, the clock circuit 35 presents the current time and moreover clocks the time-up period of the signal transmission and also operates, for example, as a trigger circuit to generate interruption to CPU of the control part 34 after the predetermined period in the case of activating the transmission task which will be explained later.

A MODEM part 36 controls an NCU part 37, modulates a transmitting data and demodulates a receiving data at the time of communication. The NCU part 37 has the function of a so-called telephone system to execute on-hook during the transmission, dialing (transmission of push-button tone using the DTMF signal for the push-button line and generation of dial pulse for the dial line), off-hook and connection of the MODEM part 36 or telephone set 40 to the telephone line 30L.

A switch 361 is an external switch with which a user can select a type of telephone line connected to the adapter 30, for example, any one of the push-button line/dial line 100 pps/dial line 20 pps and also select external line or analog internal line. Setting of this switch 361 can be detected by the control part 34 through the MODEM part 36 and the adapter 30 operates in the manner conforming to the type of telephone line connected thereto.

A buzzer 38 is controlled by the control part 34 like the LED 32 to indicate operating and processing conditions of the adapter 30 to users with its buzzer sound. For instance, normal end of transmission, transmission failure and abnormal manipulation can be indicated by buzzer sound. The buzzer 38 is capable of changing sound level, rhythm and melody in order to indicate various conditions.

A button group 33 is provided, in this embodiment, for reset processing when an error is generated and for time setting to the clock circuit 35.

Figure 7A:
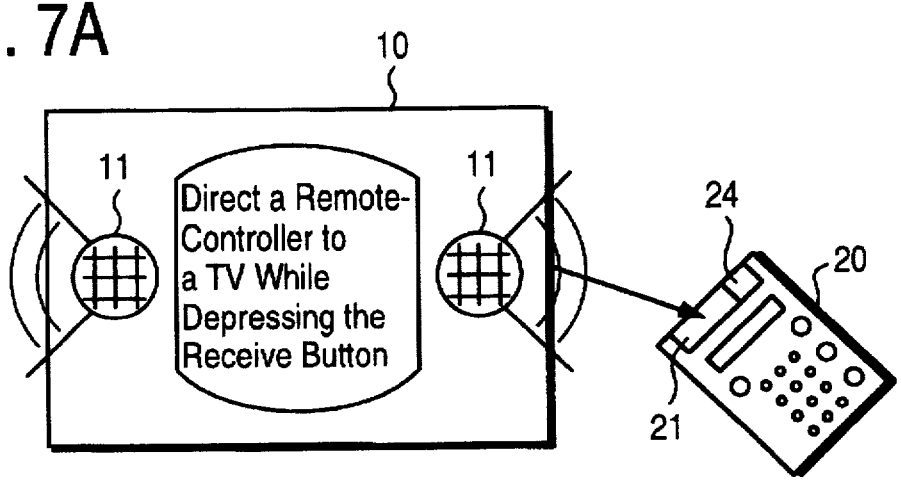
FIGS. 7A, 7B and 7C illustrate examples of images of a two-way broadcast program displayed on the receiver.

The broadcasting side produces a program, on the occasion of transmitting a two-way broadcast program, to issue an instruction to the announcer to make announcement and/or display with superimposition on the screen, in such a part of the program as requesting the audience's response, for the audiences to wait after mining ON the remote control commander 20. Moreover, the broadcasting side offers, as required, the guidance message screens (superimposition, etc.) as illustrated in FIGS. 7A, B, C or guidance announcement by an announcer to audiences in view of guiding the audience's response procedures to the two-way broadcast program. In this case, the broadcasting side should certainly transmit such guidance to audiences so that users can always perform the response operation to the two-way broadcast program in the sequence of reception to input of response information to transmission.

First, before transmitting the necessary two-way broadcast program information including the response sending telephone number, communication environment conditions and moreover response conditions by multiplexing it into the audio signal of the broadcast signal in the form of the DTMF signal, a message screen and voice message for urging acquisition of the two-way broadcast program information as illustrated in FIG. 7A are broadcasted.

When a user who has watched above messages directs the remote control commander 20 toward the television receiver 10 and depresses the receive button 29a, since the two-way broadcast program information multiplexed in the broadcast signal is outputted, as explained previously, from the loud speaker as the reproduced DTMF signal, this two-way broadcast program information is fetched into the control part 23 of the remote control commander 20 through the microphone 21 and DTMF decoder 22 and is then stored in the comprised RAM 23b.

Figure 7B:
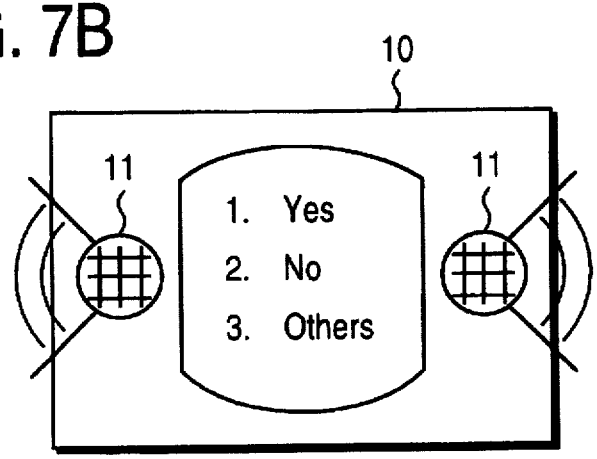

Next, the broadcasting side switches, upon completion of transmission of a broadcast signal in which the necessary two-way broadcast information is multiplexed, transmission of signal to the program signal and broadcasts contents of response request in this program. For instance, when the response selected from three items is requested, a display screen of selection items as illustrated in FIG. 7B and announcement of this screen are broadcasted.

A user receives this display screen and such voice output and performs response procedures by depressing the number selected from the button group 29e of the remote control commander 20. Thereby, the remote control commander 20 produces a response information in accordance with such response procedures. This response information is once stored in the RAM 23b comprised in the remote control commander 20.

Figure 7C:
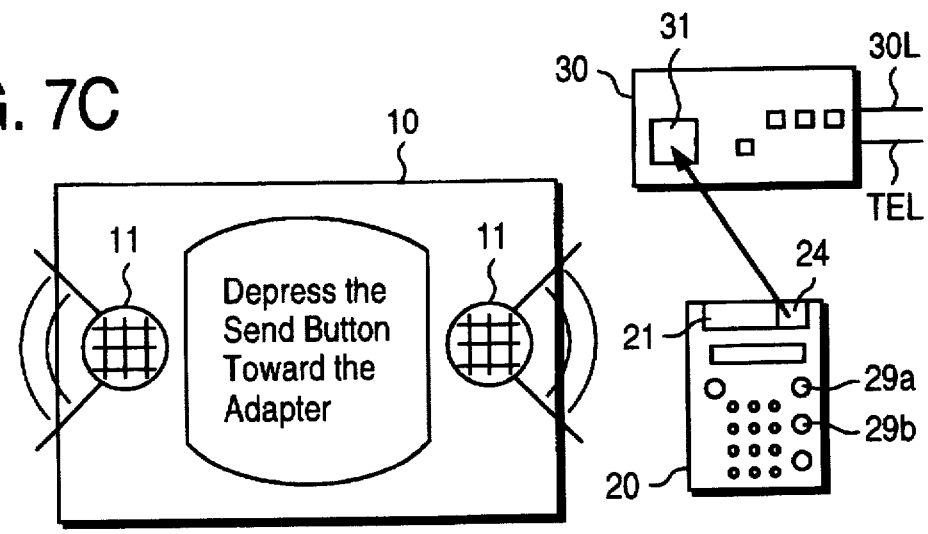

Next, the broadcasting side broadcasts a message screen and message announcement as illustrated in FIG. 7C to urge users to transmit the two-way broadcast program information fetched as explained above and the response information to the adapter 30. In response to this broadcast, users depress the send button 29b. Thereby, the remote control commander 20 transmits the two-way broadcast program information and the response information of, for example, the infrared remote control signal.

The adapter 30 automatically dials to the designated response sending destination on the basis of the received two-way broadcast program information and transmits the response information to the relevant response sending destination through the telephone line 30L.

Next, operations of the remote control commander 20 and the adapter 30 explained above will then be described with reference to FIG. 8 to FIG. 13.

Figure 8:
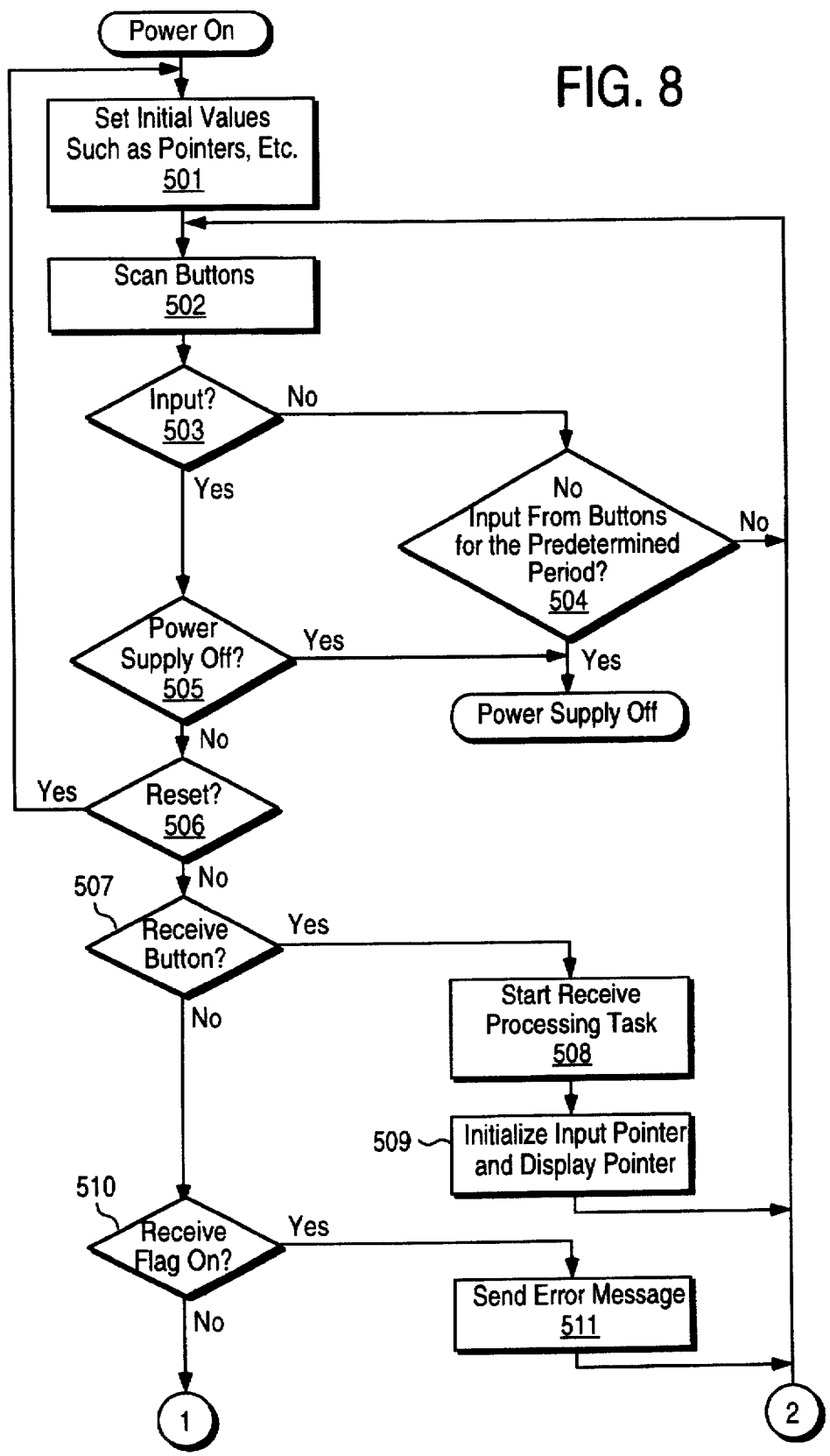
FIG. 8 is a flowchart for explaining operations of the remote control commander used in the receiving system according to the present invention.
Figure 9:
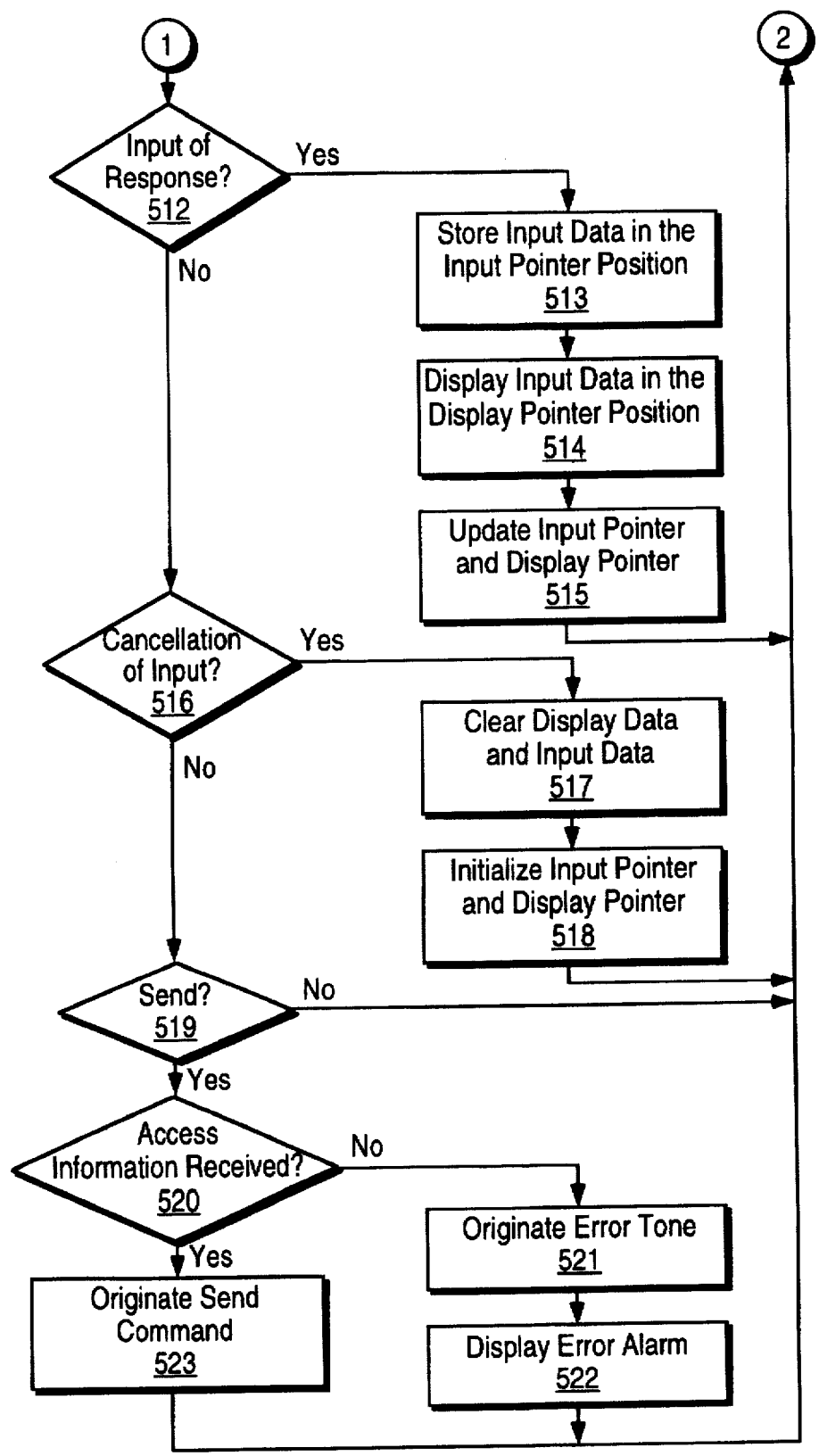
FIG. 9 is a subsequent flowchart of FIG. 8 for explaining operations of the remote control commander used in the receiving system according to the present invention.

FIG. 8 and FIG. 9 are flowcharts illustrating the flow of whole operations of the remote control commander 20 during a routine started by mining ON the power supply button and ended by turning OFF the power supply button.

When the power supply button 20a of the remote control commander 20 is mined ON, the routine of FIG. 8 is started and the control part 23 initializes pointers indicating memory addresses used when data is stored to or read from the RAM 23b (step 501).

In this example, the RAM 23b has two memory areas including an input data area and a display data area for LCD. An input pointer is set for the input data area, while a display pointer for the display data area. Next, the control part 23 scans the power supply button 20a and the other buttons 29a to 29e (step 502) to confirm manipulation of buttons for input in order to check manipulation of buttons for input (step 503).

When any manipulation of buttons for input is not performed, it is checked whether any manipulation of buttons for input is performed or not (step 504) for a constant period, for example, 10 minutes from turning ON of the power supply switch. Check of this step 504 is cleared at the timing, for example, of turning ON of the power supply button and is performed by recognizing a constant period, for instance, 10 minutes with a timer counter for counting an oscillation output from the clock circuit 27. If any manipulation of buttons for input is not performed during 10 minutes or longer from turning ON of the power supply button, the power supply button is automatically turned OFF to prevent useless power consumption of the battery. When 10 minutes have not yet passed from mining ON of the power supply button, the processing is started again from the step 502.

When the check process of the step 503 confirms input by button operations, such button operation is checked whether it is performed to turn OFF the power supply button or not (step 505). In this case, when the button operation has been executed to turn OFF the power supply button, the power supply of the remote control commander 20 is turned OFF. If the button operation is not performed to turn OFF the power supply, a button operated is checked whether it is the reset button 29d or not (step 506).

When the reset button 29d is checked to have been manipulated by the check process of the step 506, the process of step 501 is performed again to initialize the pointers. If the reset button 29d is not operated for input, it is checked that the receive button 29a has been manipulated or not (step 507).

Figure 10:
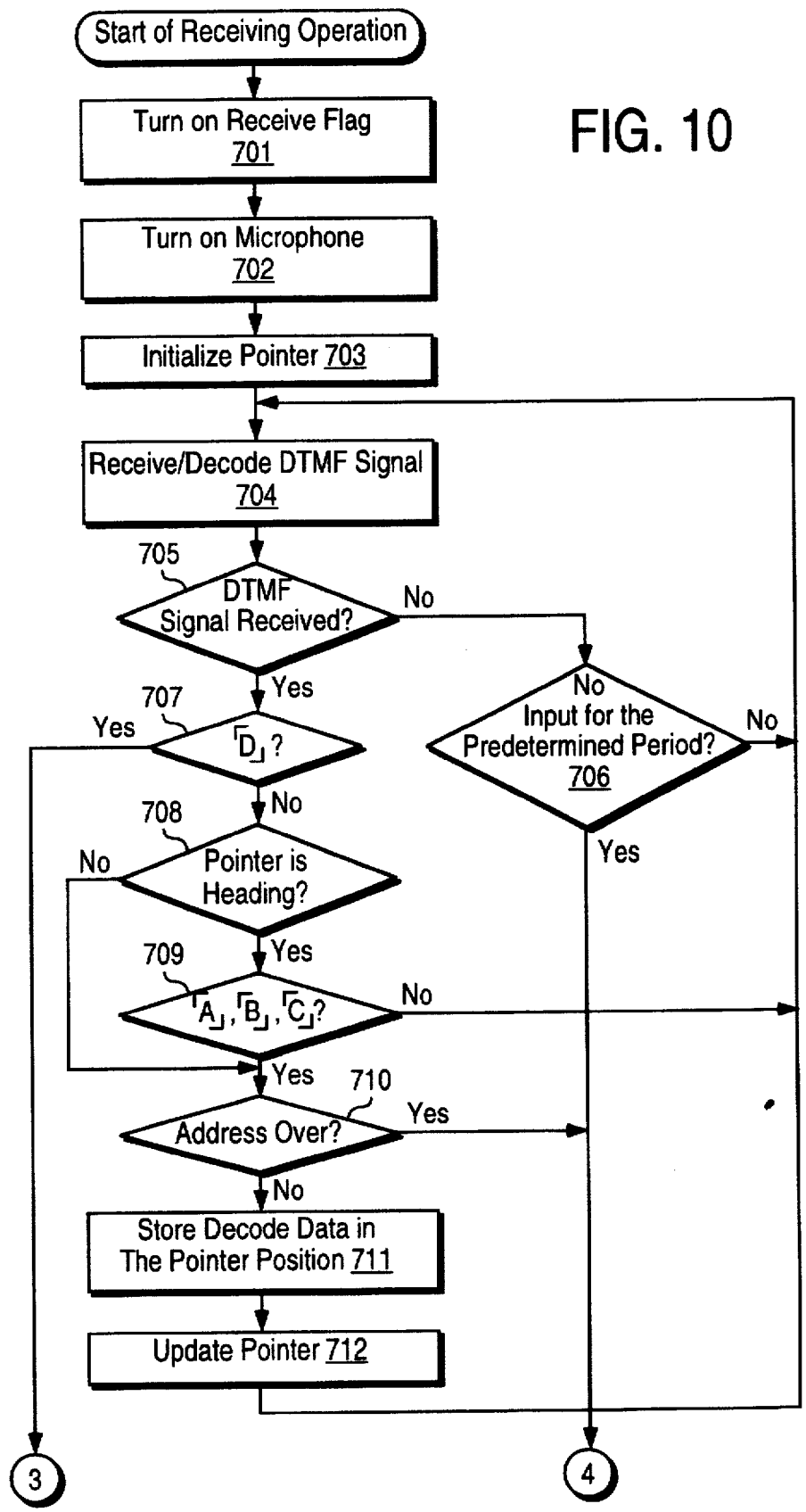
FIG. 10 is a flowchart for explaining audible sound receiving operation of the remote control commander in one embodiment of the receiving system according to the present invention.
Figure 11:
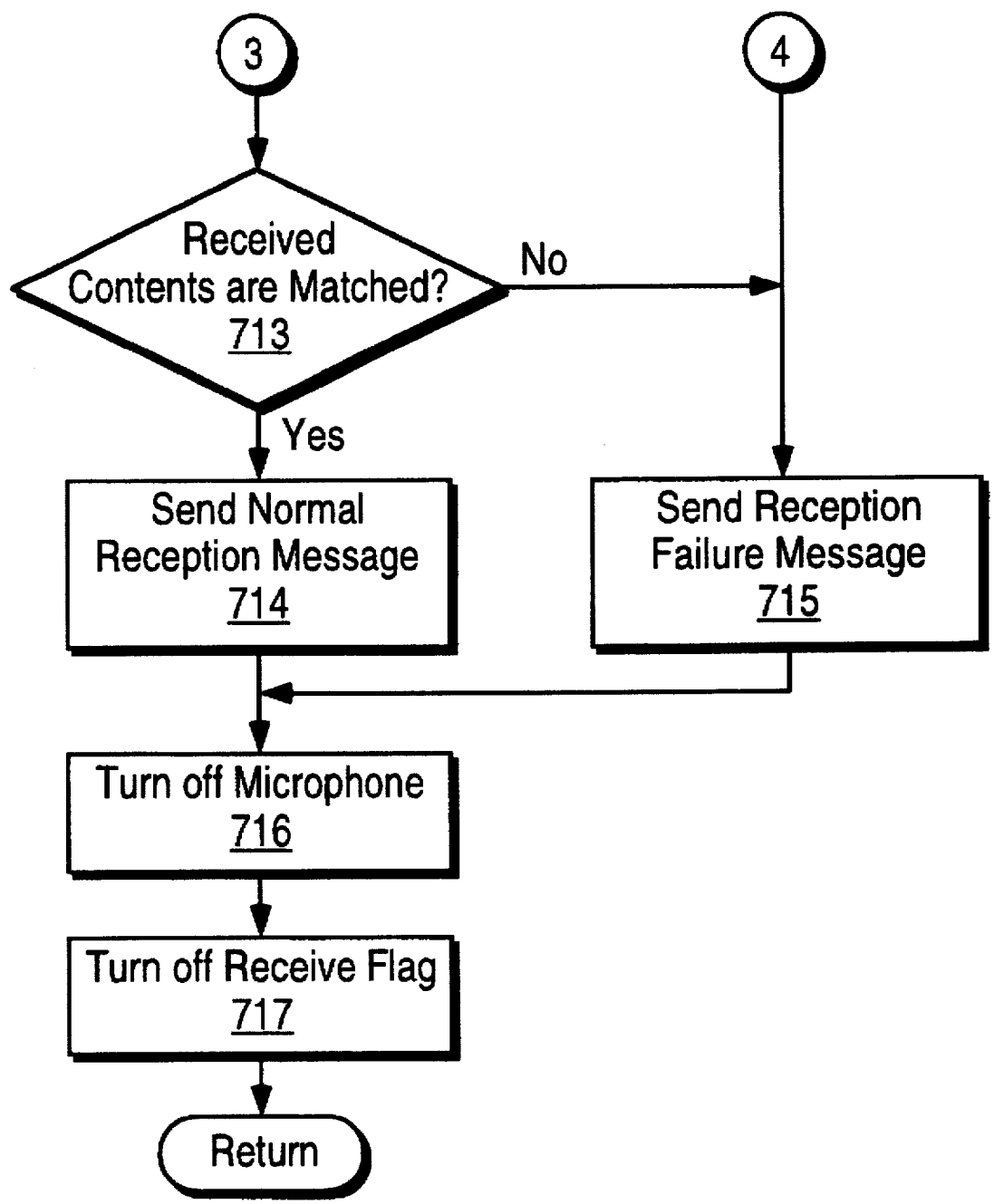
FIG. 11 is a subsequent flowchart of FIG. 10 for explaining audible sound receiving operation of the remote control commander in one embodiment of the receiving system according to the present invention.

When the receive button 29a is confirmed to have been manipulated by the check process of the step 507, the DTMF signal receiving process task, which will be explained in detail with reference to FIG. 10 and FIG. 11, is started (step 508). In this receiving process task, the reproduced sound of the DTMF signal is collected from a speaker system 11 of the television receiver, in this embodiment, and is then decoded and finally stored in the remote control commander 20. Upon completion of this receiving process task, the input pointer and display pointer used in the above receiving process are initialized (step 509) and the process is performed again from the step 502.

When the button operated for input has been detected not to be the receive button by the check process of the step 507, whether the receiving flag is mined ON or not is checked (step 510).

This receiving flag is turned ON or OFF in the DTMF signal receiving process task explained later in detail. When the receiving flag is turned ON, it means that the DTMF signal is in the course of reception.

Therefore, when the receiving flag is turned ON in the step 510, it means that any button is depressed while the two-way broadcast program information is being received. Therefore, the buzzer 26 outputs a buzzer sound indicating generation of an error. Simultaneously an error message is displayed on the LCD 25 in order to inform users of generation of error (step 511). After the error message is issued, the process of step 502 is started again. Thereby, the subsequent process, for example, transmission of response due to the receiving data of the incomplete DTMF signal can be prevented.

When the receiving flag is detected not to be mined ON by the check process of the step 510, the check process of the step 512 illustrated in FIG. 9 is performed. In the check process of the step 512, whether the button operated is the response input button or not, in the case of this embodiment, it is the response button such as 0 to 9, *, # explained as the button group 29e of FIG. 2 or not is checked.

When check process of the step 512 has decided that any of the response button group 29e is manipulated, the input data is stored in the address position of the RAM 23b indicated by the input pointer (step 513). Moreover, the input data is also written in the address position of RAM 23b indicated by the display pointer and this written input data is displayed on the LCD 25 (step 514). Next, the input pointer and display pointer are updated (step 515) and the process of the step 502 is started again.

When the check process of the step 512 has decided that the button operated is not the response button, the manipulated button is checked whether it is the input cancel button 29c or not (step 516). When the input cancel button 29c is decided to be operated, the input data and display data written in the RAM 23b are cleared (step 517). When these data are cleared, the input pointer and display pointer are initialized (step 518). Thereafter, the process of the step 502 is started again.

When the check process of the step 516 has decided that the button manipulated is not the input cancel button 29c, whether the send button is operated or not is checked (step 519). In this case, when the send button 29b is not operated, the process of the step 502 is started again.

When the send button 29b is operated, whether the two-way broadcast program information offered by the DMTF signal, particularly the access information is received or not, that is, whether the normally received access information exists in the memory or not is checked (step 520). When it is not received, an error is notified with buzzer sound from the buzzer 28 (step 521) and an error message is displayed on the LCD 25 to inform that the two-way broadcast program information is not received or is not received accurately (step 522).

When the two-way broadcast program information is already received, the two-way broadcast program information and input response information are transmitted to the adapter 30 as the remote control signal (step 523). After these signals are transmitted, the process of the step 502 is started again.

Here, it is also possible in the step 520 to decide whether only the access information required for transmission of the response information is received or not, in place of deciding whether the two-way broadcast program information is all received or not.

In the routines of response operation of the remote control commander 20 and the command transmitting operation to the adapter 30 illustrated in FIG. 8 and FIG. 9 explained above, the step 510 is provided to invalidate, when the receiving flag is turned ON, that is, when the two-way broadcast program information is being received, the manipulation input of the other buttons such as the response button group 29e, input cancel button 29c and send button 29b. Thereby, transmission of response can be protected from erroneous transmission due to the imperfect two-way broadcast program information (particularly, response access information such as access address information and communication conditions) appearing during the reception.

Moreover, since a guidance is broadcasted, as explained above, to the viewers in the two-way broadcast program to urge the response operation to the two-way broadcast program in the sequence of the reception of the access information to input of response to transmission of response in addition to the provision of the step 510, the sequence of the response operation is surely started from the reception of the access information and an operation mistake such as erroneous transmission of the response to the preceding request can be prevented.

Furthermore, since whether the access information is received or not is checked to transmit the response information in the step 520, such a useless operation as sending the response information while the access destination is not obvious can also be prevented.

Next, the DTMF signal receiving process task performed on the remote control commander 20 will be explained with reference to FIG. 10 and FIG. 11. This DTMF signal receiving process task is activated in the step 508 and is then executed as explained in regard to FIG. 8.

The receiving process task is basically executed in parallel independent of the other tasks. The receiving process task is ended in any of the timings for completing the reception, generating an error such as timeout, depressing the reset button and mining OFF the power supply button 20a.

As explained above, when the power supply switch of the remote control commander 20 is turned ON and the receive button is depressed, the control part 23 of the remote control commander 20 drives the DTMF signal receiving process task to turn ON the receiving flag first for indicating that the DTMF signal is being received (step 701).

Here, the electrical power is supplied to the microphone 21 of the remote control commander 20 to collect the reproduced sound (step 702). Next, the pointer indicating an address for storing the received data in the RAM 23b is initialized and a timer counter (not illustrated) used for deciding the timeout is also initialized (step 703). As is already explained above, the voices outputted from the speaker system 11 of the television receiver 10 are collected through the microphone 21 and the DTMF signal is detected in the DTMF receiving circuit 22 and is then decoded (step 704).

Whether the DTMF signal is received or not is checked (step 705). When it is not received, it is then checked whether the DTMF signal is not received within the predetermined constant period, for example, within 10 minutes with reference to the timer counter (step 706). When it is decided that the DTMF signal is not received within the constant period in the check process of the step 706, the process of step 715 explained later is started.

When reception oft he DTMF signal is detected in the check process of the step 705, it is then checked whether the signal received is the function signal "D" indicating the transmission end information (step 707). When the received DTMF signal is not the function signal "D", it is then checked whether the pointer indicating a storing address of the received data has the leading value (initial value) or not (step 708). When the pointer has the initial value, it is checked whether the received DTMF signal is any one of the function signals "A", "B", "C" indicating the transmission start information (step 709).

When it is detected by the check process in the step 709 that the received DTMF signal is not the function signals "A", "B", "C" indicating the transmission start information, the process of the step 704 is started again.

When the pointer is detected not to have the initial value by the check process in the step 708 and when the received DTMF signal is detected not to be any one of the function signals "A", "B", "C" by the check process in the step 709, the address indicated by the pointer is checked whether it is larger than the predetermined storage area of the receiving data or not (step 710). In this case, when the storing position of the receiving data indicated by the pointer is in the outside of the predetermined storage area, the process of the step 715 explained later is started.

When the position indicated by the pointer is within the storage area in the check process of the step 710, the decoded DTMF signal is stored in the position indicated by the pointer of the RAM 32b for storing the received data (step 711) and the pointer is updated to set the next address (step 712). Here, the process of the step 704 is started again to repeat the abovementioned process. This process is repeated until the function signal "D" indicating the end of the transmission of the DTMF signal is detected.

When the function signal "D" indicating the end of transmission is detected in the check process of the step 707, matching of a series of the DTMF signals received and stored in the memory is checked (step 713). When these DTMF signals are matched, a buzzer sound is generated only for a short period like a whistling sound, in order to indicate that the DTMF signals are received normally and a message is also displayed on the LCD to inform normal reception to users. Here, power supply to the microphone 21 is stopped to turn OFF the microphone (step 716) and the receiving flag is also turned OFF (step 717).

When it is decided in the step 706 that no DTMF signal is received within the predetermined period, or when the position on the RAM 23b indicated by the pointer is in the outside of the storage area in the step 710 or when there is no match in the received DTMF signal in the step 713, the buzzer generates a sound only for a short period like a whistling sound and an error message is displayed on the LCD 25 to inform users that the DTMF signal is not received or received abnormally (step 715). The microphone 21 is turned OFF (step 716) and the receiving flag is also turned OFF (step 717) to complete the DTMF signal receiving task.

As explained above, the DTMF signal sandwiched, for example, between the function signals "A" and "D" is received and is then stored in the memory such as RAM 23b.

During reception of the DTMF signal, the remote control commander 20 can inform users the receiving process by displaying a symbol such as "*" on the LCD 25 for each detection and decoding of one DTMF signal.

The DTMF signal is not decoded if it does not conform to the specifications with reference to FIG. 3 and FIG. 4.

Next, operations of the adapter 30 which receives information with a remote control signal from the remote control commander 20 as explained above will then be explained with reference to FIG. 12 and FIG. 13.

Figure 12:
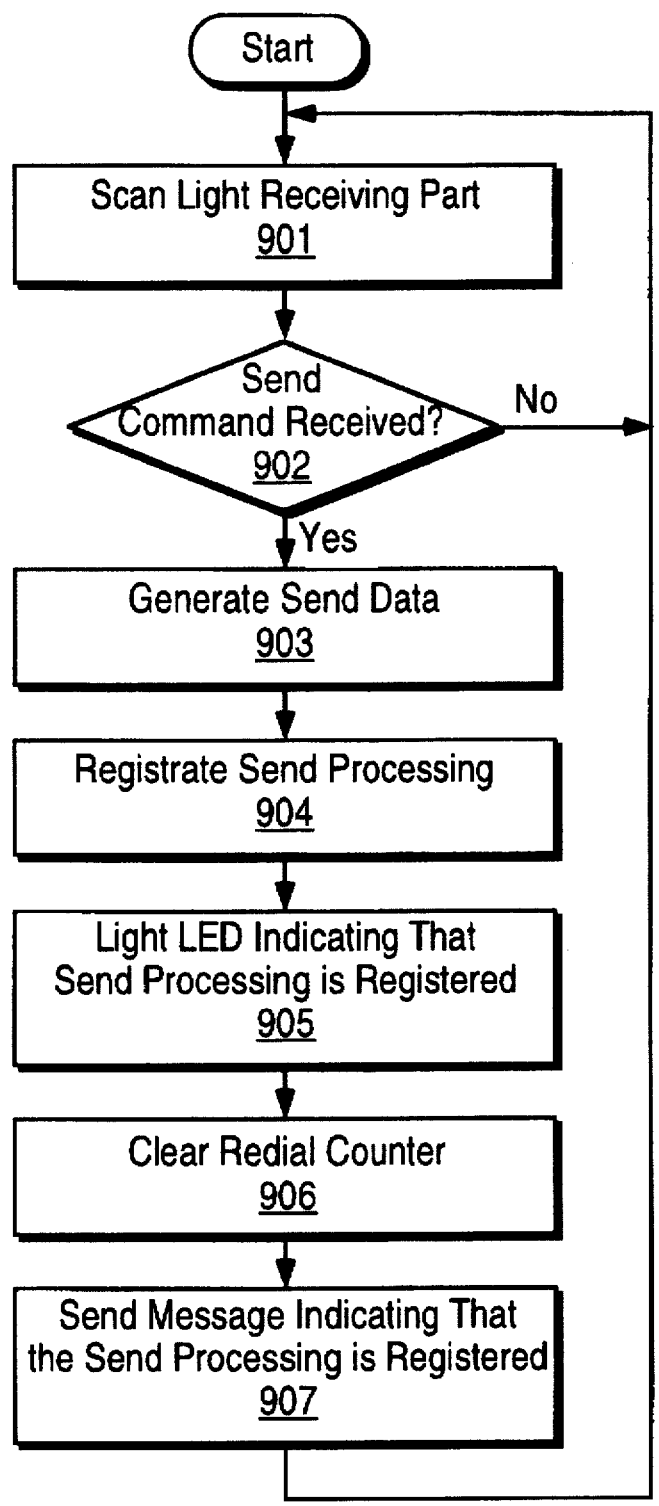
FIG. 12 is a flowchart for explaining remote control signal receiving and subsequent operations in one embodiment of an adapter used in the receiving system according to the present invention.

FIG. 12 is a flowchart indicating operations after the adapter 30 has received the two-way broadcast program information and the response information to the two-way broadcast program transmitted as the remote control signal from the remote control commander 20.

The control part 34 scans (step 901) a signal which is received by a light receiving part 31 and is then supplied through a receiving circuit 311 to detect whether the remote control signal RC is received or not from the remote control commander 20 (step 902). In this case, when the remote control signal RC is not detected, the process of the step 901 is started again to repeat the scanning of the signal supplied.

When the remote control signal is detected by the detection process of the step 902, the received remote control signal is decoded and the access address information and access condition information is separated from the response information among the two-way broadcast program information including the response sending telephone number and information for limiting the last digit of the telephone number, etc. and the access address information and access condition information are stored in the memory. An apparatus ID inherent to the adapter 30 being stored in the ROM 34a of the control part 34 is read and is then added to the response information and moreover the information to be returned among the two-way broadcast program information is also added as required to the response information in view of producing the transmitting data (step 903).

The send processing of the produced transmitting data is registered and the process to be transmitted through the telephone line 30L after the predetermined time using the access address information and access condition information is also registered in the RAM 34b of the control part 34 (step 904). In order to inform registration of the transmitting process, the control part 34 controls LED 32 to light (step 905).

Next, a redial counter (not illustrated), for counting the number of times of redial operations, is cleared (step 906) and it is notified with a buzzer sound (for example, a sound such as a whistling sound for a short period) generated by the buzzer 38 that the transmitting process is normally registered and the transmission is ready (step 907). Here, the process of the step 901 is started again for repeating the scanning of the signal from the light receiving part.

Here, it is also possible that the transmitting process to be registered in the step 904 is specified not to be registered in the plural number and when the preceding transmitting processes remain unprocessed, these may be cleared or the transmitting process is specified to be registered in the plural number and the registered transmitting processes are cleared using a clear command of the remote control signal. In addition, it is also possible to provide a function to ignore the subsequent depression of the send button so that useless access is no longer generated for several responses to the same access information, for example, when the send button is depressed twice for the same request.

Figure 13:
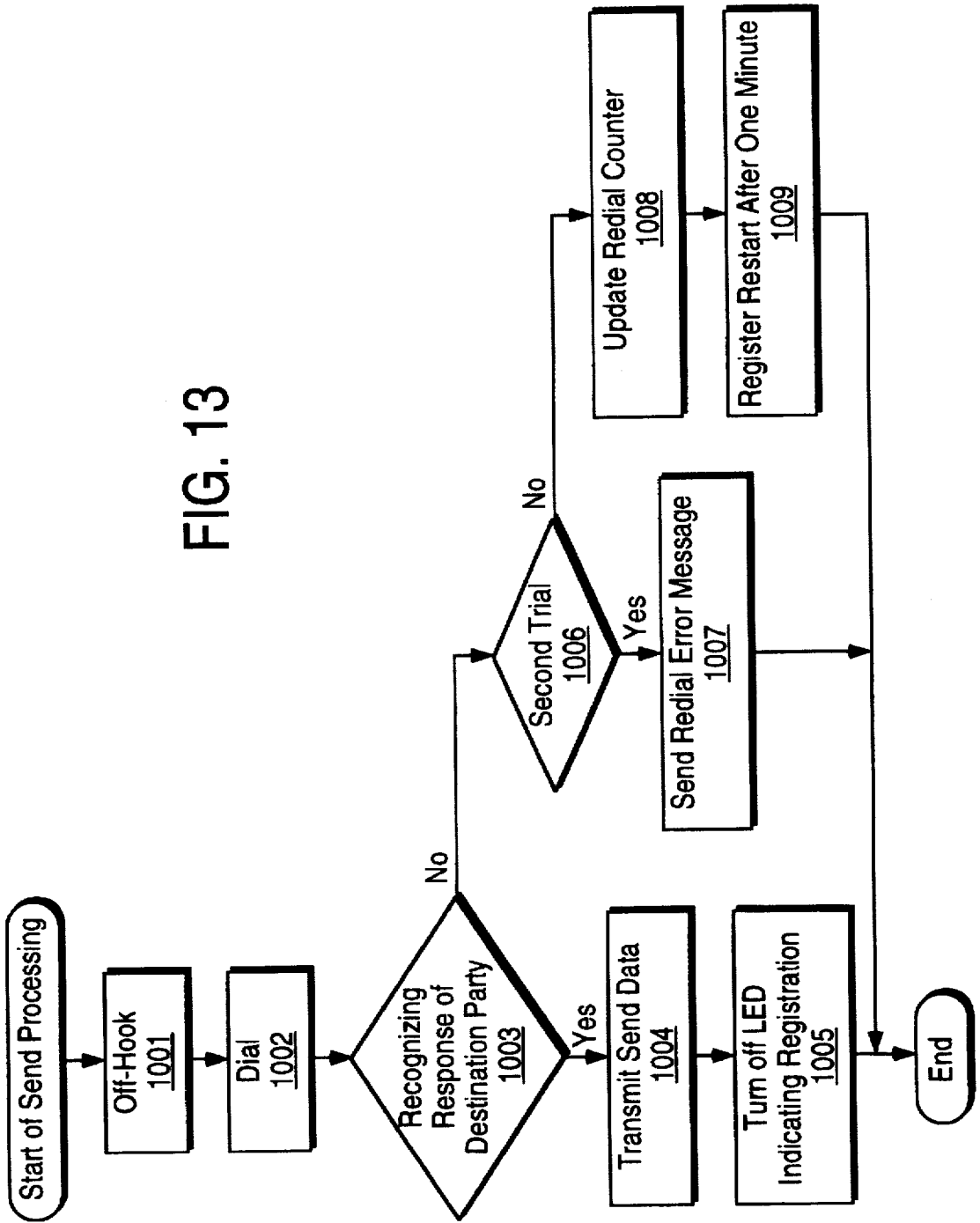
FIG. 13 is a block diagram for explaining transmitting operations performed in one embodiment of the adapter used in the receiving system according to the present invention.

FIG. 13 is a flowchart illustrating the operations of the adapter 30 for transmitting the response information on the basis of the transmitting process received and registered as described above.

In the case of this example, the transmitting process is controlled to be driven at random with different delay times of each adapter by the clock circuit 35 and control part 34 after the information of the aforementioned transmitting process is registered. This control provides the effect of preventing that transmission of the response information from being centralized at a certain time, thereby resulting in so-called the traffic jam of the telephone line.

When the receiving processes registered in the adapter 30 are driven, the control part 34 first controls the modem part 36 and NCU part 37 for making off-hook (step 1001). Next, similarly, the control part 34 makes dial operation using the telephone number of the response sending destination in the access information (step 1002). When termination of call to the distant party (response sending destination) is recognized (step 1003) and connection of the telephone line to the destination is confirmed, the already generated transmitting data including the response information is transmitted (step 1004) and LED lighting to indicate registration of the transmitting process goes out (step 1005), completing this transmitting process routine.

If connection of telephone line is not extended up to the response sending destination in the process of the step 1003, it is then checked that the redial counter indicates 2 or not (step 1006). When it is confirmed by the check process in the step 1006 that the redial counter indicates 2, three times of dial operations have been actually completed and a redial error is informed by the buzzer sound to users (step 1007) so that the third and subsequent redials are not executed, thereby completing the transmitting process routine.

When the redial counter does not indicate 2 in the check process of step 1006, the redial counter is updated (step 1008) and registration is made (step 1009) to start again the transmitting process after one minute, thereby completing the current transmitting process.

According to the receiving system having a structure explained above, the adapter 30 is not always required to be installed in the vicinity of the television receiver 10, lessening limitation on the installation area of the adapter 30.

Next, the second embodiment of the present invention comprising the adapter provided with a microphone and a DTMF decoder for making communication through the telephone line will be explained hereunder.

Figure 14:
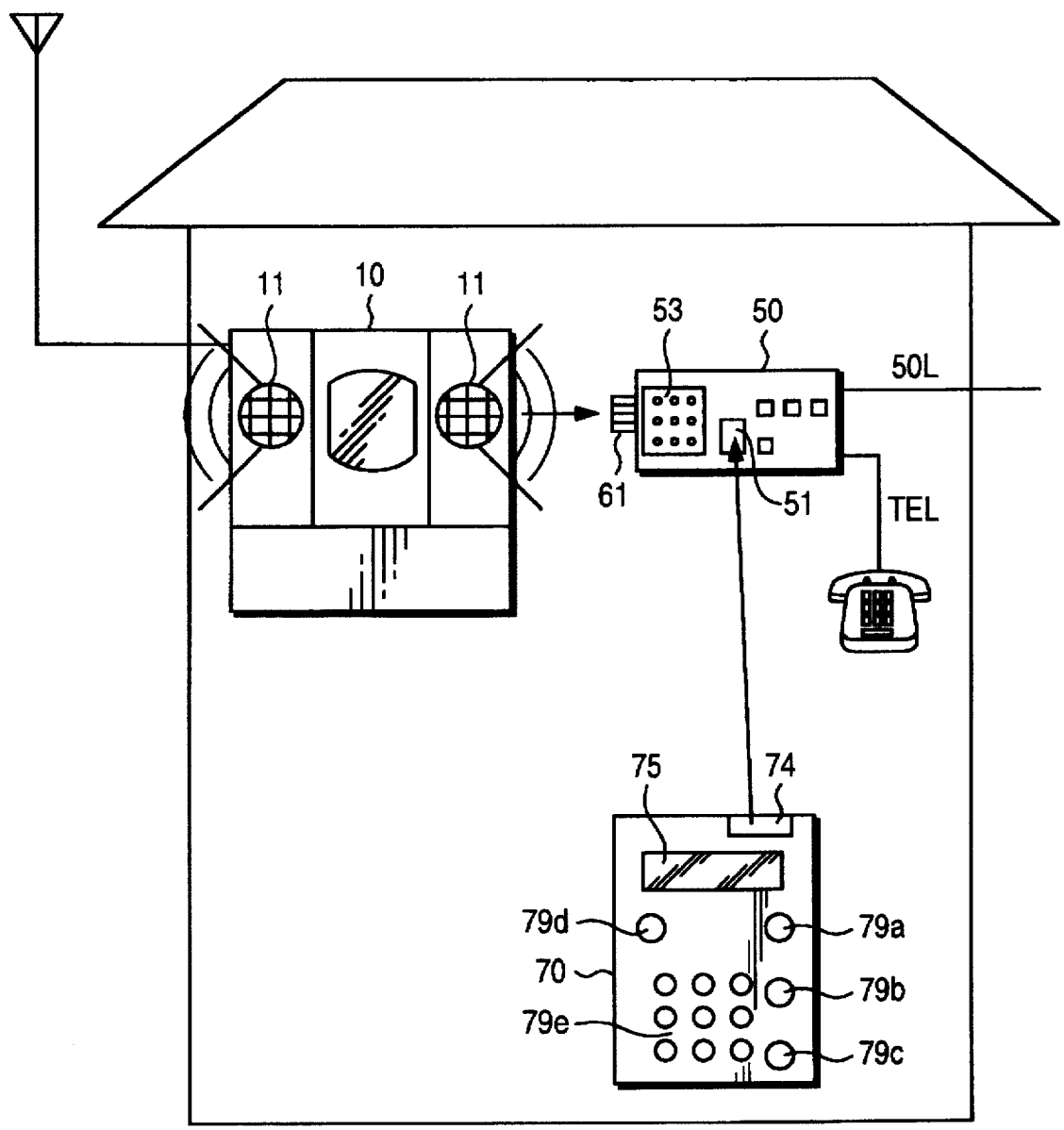
FIG. 14 is a schematic diagram illustrating a receiving system of another embodiment of the receiving system according to the present invention.

FIG. 14 is a diagram illustrating a receiving system of the second embodiment of the present invention. The receiving system of this embodiment is formed of a television receiver 10, an adaptor 50 and a remote control commander 70. The television receiver 10 is similar to that of the first embodiment and images and announcement of the broadcast program can be offered by receiving these signals with the television receiver.

When the television receiver 10 has received the two-way broadcast program, the two-way broadcast program information is multiplexed as the DTMF signal in the principal audio signal of the two-way broadcast program signal as described previously. Therefore, the reproduced sound of the DTMF signal is outputted together with the reproduced sound of the principal audio signal from the loud speaker system 11 of the television receiver 10.

The adapter 50 comprises, as illustrated in FIG. 14, a microphone 61 and is connected to the telephone line 50L. The microphone 61 collects the reproduced sound outputted from the loud speaker 11 of the television receiver 10. The adapter 50 also comprises, as is explained later in detail, a DTMF decoder which removes the DTMF signal, when the two-way broadcast program information is multiplexed as the DTMF signal in the voices collected by the microphone 601, then decodes the signal and stores it in the memory.

The adapter 50 also comprises a modem part therein to transmit and receive the data through the telephone line 50L as explained later in detail. The response information to the two-way broadcast program is transmitted to the response sending destination in the broadcasting side based on the access address information among the two-way broadcast program information removed, decoded and stored in the adapter 50. In this embodiment, the response information to the two-way broadcast program is produced by the remote control commander explained later and is then supplied as the infrared remote control signal to the adapter 50.

The remote control commander 70 produces the response request offered by the two-way broadcast program reproduced by the television receiver 10, for example, the response information to the questions of a quiz or research program, through the user's operation of the response button group 79e explained later and transmits the produced response information from the transmitting part 74 of the infrared remote control signal to the infrared receiving part 51 of the adapter 50.

In this embodiment, as explained above, the two-way broadcast program information offered as the reproduced sound of the DTMF signal is collected by the adapter 50 and is then decoded. Therefore, the remote control commander 70 is not required to comprise the microphone and DTMF decoder, unlike the first embodiment. Accordingly, the remote control commander 70 is not provided with the power supply button and receive button for starting the sound collecting operation with the microphone.

The remote control commander 70 is provided, for example, with the operation input buttons such as a receive instruction button 79a for transmitting the infrared remote control signal to start the sound collecting operation of the adapter 50, a response button group 79e (button group corresponding to 0 to 9, * and #) for inputting the response information to the two-way broadcast program, a cancel button 79c used for canceling the information formed by operation of the response button group, a send button 79b for starting the operation to transmit, as the infrared remote control signal, the response information corresponding to the two-way broadcast program formed by operating the response button group 79e and a reset button 79d for transmitting the infrared remote control signal for initializing the adapter 50.

Figure 15:
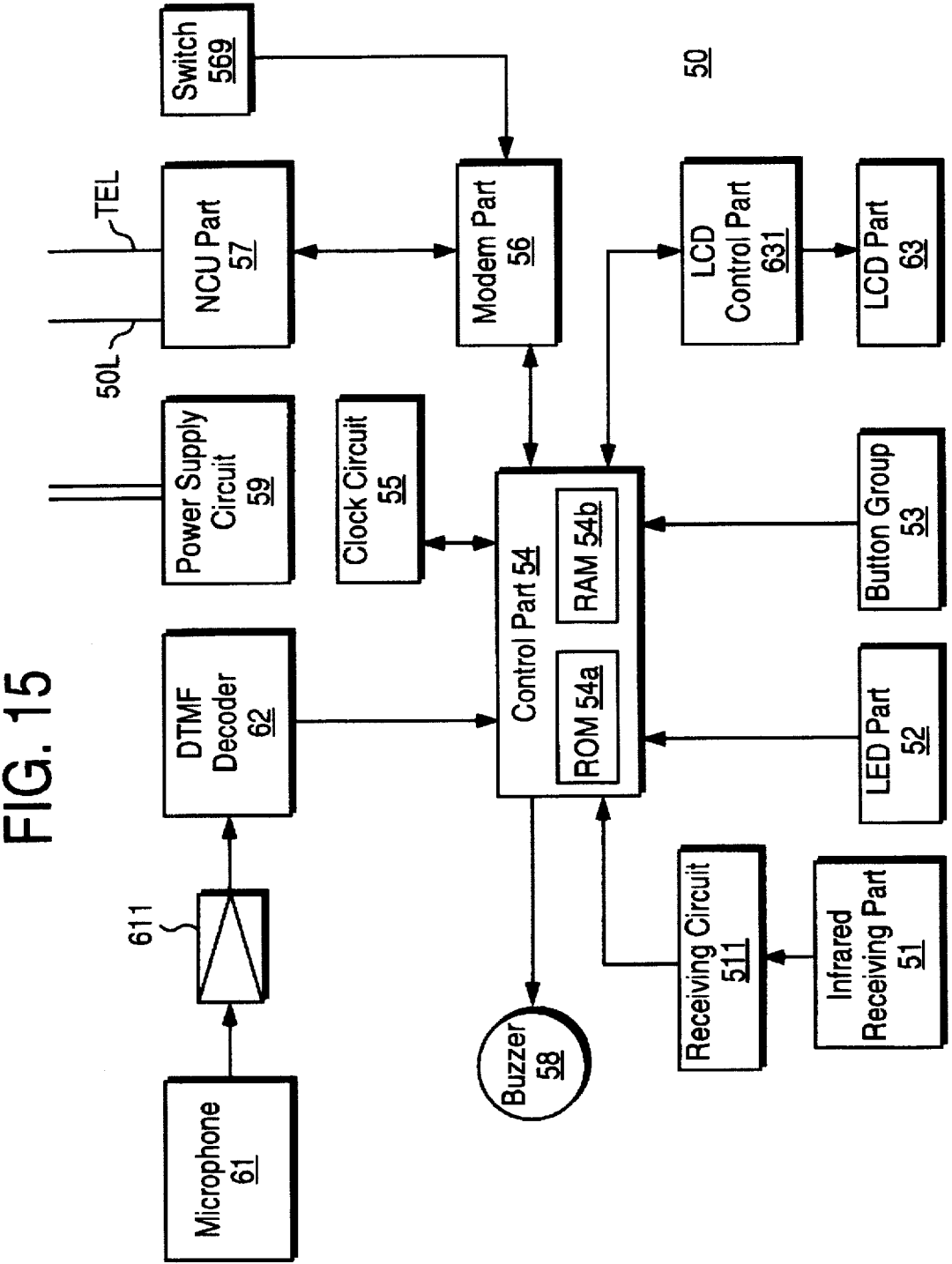
FIG. 15 is a block diagram for explaining the adapter used in another embodiment of the receiving system according to the present invention.

FIG. 15 is a block diagram illustrating an embodiment of the adapter 50 in this embodiment. The adapter 50 comprises a microphone 61, an amplifying circuit 611, a DTMF decoder 62, an LCD (liquid crystal display) part 63, an LCD control circuit 631, an infrared receiving part 51, a receiving circuit 511, an LED part 52, a button group 53, a control part 54, a clock circuit 55, a modem part 56, a switch 569, an NCU part 57, a buzzer 58 and a power supply circuit 59. The structure of this adapter is similar to the adapter 30 of the first embodiment, except for the microphone 61, amplifying circuit 61, DTMF decoder 62, LCD part 63 and LCD control part 631.

The adapter 50 collects, through the microphone 61, the sound outputted from the speaker system 11 of the television receiver 10. The collected sound is then supplied to the DTMF decoder 62 as the voice signal through the amplifying circuit 611. The DTMF decoder 62 detects the DTMF signal which is multiplexed in the principal audio signal as the two-way broadcast program information from the voice signal supplied and then decodes the DTMF signal into the function signals (0–9, *, #, A–D) determined by combination of the frequencies of low group and high group as is already explained with reference to FIG. 3. The decoded DTMF signal is then supplied to the control part 54 and stored in the RAM 54b.

The receiving process task covering collection of the voice signal, detection of the DTMF signal, decoding thereof and storing thereof to be performed in the adapter 50 is similar to the receiving process task covering from collection of the voice signal to storing into the memory performed in the remote control commander 20 explained with reference to FIG. 10 and FIG. 11 regarding the first embodiment.

This receiving process task is basically performed in parallel independent of the other tasks. This receiving process task is started in such a timing, although not illustrated, when the receive button provided in the button group 53 of the adapter 50 is depressed or when the receive instruction button 79a of the remote control commander 70 explained above is depressed and the adapter 50 has received the infrared remote control signal indicating instruction for reception.

Moreover, the end timing of the receiving process task executed in the adapter 50 is set when the receiving operation is completed normally or completed erroneously due to the timeout, or completed when the adapter 50 has received the infrared remote control signal transmitted by depression of the reset button 79d from the remote control commander 70, or when the adapter 50 receives again the infrared remote control signal instructing the reception due to depression of the receive instruction button 79a of the remote control commander 70 during execution of the receiving process task.

Figure 16:
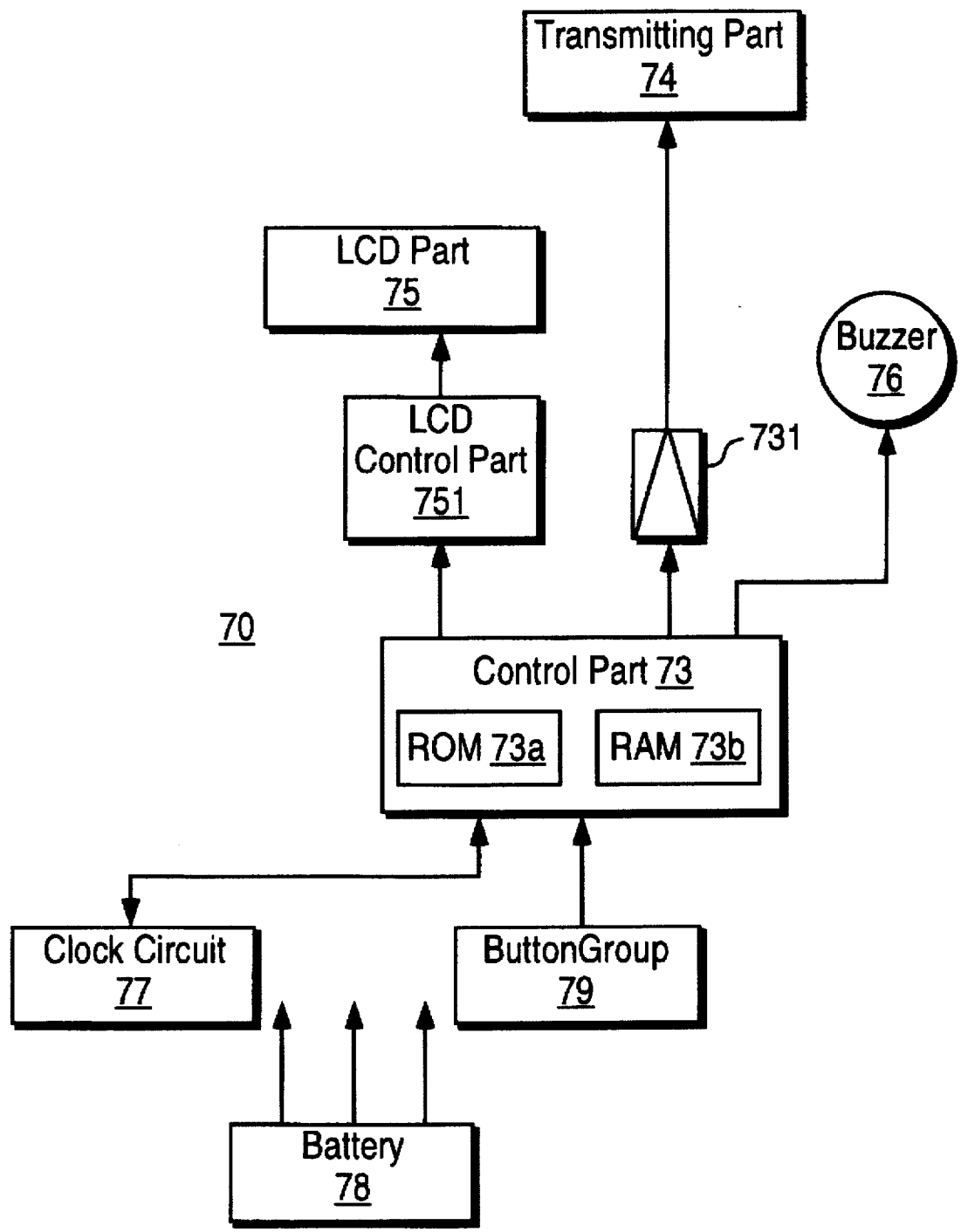
FIG. 16 is a block diagram for explaining the remote control commander used in another embodiment of the receiving system according to the present invention.

FIG. 16 is a block diagram illustrating an embodiment of the remote control commander 70 of this embodiment. The remote control commander 70 comprises a control part 73, a transmitting pat 74 of the infrared remote control signal, and LCD part 75, an LCD control part 751, a buzzer 76, a clock circuit 77, a battery 78 and a button group 79.

The remote control commander 70 in this embodiment is similar to the remote control commander 20 of the first embodiment where the microphone 21, amplifying circuit 211 and DTMF decoder 22 are removed. But, the button group 79 includes the receive instruction button 79a and reset button 79d having the function different from that of the button group 29 of the remote control commander 20 of the first embodiment explained above.

The remote control commander 70 produces the response information to the two-way broadcast program by operating the response button group 79e explained above and then stores this information in the RAM 73b of the control part 73. This response information is read from the RAM 73b when the send button 79b is depressed and is then outputted from the transmitting part 74 as the infrared remote control signal. The infrared remote control signal is received by the infrared receiving part 51 of the adapter 50.

Generation of send data and registration of transmitting process are performed in the same manner as the receiving operation of the remote control of the adapter 30 described with reference to FIG. 12 and completion of these operations is displayed on the LCD part 63 and LED part 52 for notifying it to users.

Upon completion of the generation of transmitting data and registration of the transmitting process, the adapter 50 starts the transmitting process of the response information. The transmitting process of the response information to be executed in the adapter 50 is similar to that explained above with reference to FIG. 13.

It is also possible that reception of response information is accepted even during execution of the DTMF signal receiving task in the adapter 50 and thereby the subsequent operations of the step 903 can be started after normal completion of the DTMF signal receiving task.

As explained above, the remote control commander 70 includes a microphone and therefore it inputs the response information to the two-way broadcast program and sends the input response information as the infrared remote control signal. Moreover, since the remote control commander 70 does not comprise a microphone, it can alleviate load of the control part 73 and suppress consumption of power supplied from a battery 78.

In addition, since the power supply button is removed from the remote control commander 70, the remote control commander of the television receiver 10 and the remote control commander 70 of the adapter 50 of this embodiment can be integrated easily by providing a switch for changing over the television mode and response mode.

The remote control commanders 20, 70 in the first and second embodiments are respectively provided with the send buttons 29b, 79b. When the send buttons 29b, 79b are depressed, the response operation time is obtained from the clock circuits 27, 77 comprised in the remote control commanders 20, 70 and this time information can also be transmitted to the adaptors 30, 50 after it is added to the response information to the two-way broadcast program.

Therefore, the response information having the earlier response operation time can be extracted precedingly at the response sending destination, without relation to the termination sequence of the response information, by sending the response information to be transmitted, after addition of the response operation time thereto, to the response sending destination in the broadcasting side through the telephone lines 30L, 50L from the adapters 30, 50. Thereby, the present invention can also be applied to the two-way broadcast program such as a quiz program introducing the earlier first response system.

In the first and second embodiments, it is also possible that the current time is obtained from the clock circuits 35, 55 of the adapters 30, 50 when the adapters 30, 50 have received the response information from the remote control commanders 20, 70 as the infrared remote control signal and then it is added to the response information. Thereafter, such response information can be transmitted to the response sending destination in the broadcasting side.

Further, it is possible that the remote control commanders 20, 70 of the first and second embodiments are not provided with the send buttons 29b, 79b and therefore when any button of the response button groups 29e, 79e is depressed, the infrared remote control signal corresponding to the button depressed is transmitted as the response information. In this case, the current time can be obtained from the clock circuits 35, 55 and this current time can be added in the adapters 30, 50 which receives the infrared remote control signal transmitted as the response information. Thereby, it is no longer required to provide the clock circuit in the remote control commanders 20, 70 and a remote control commander simplified in structure can also be realized.

Next, the third embodiment which is characterized by using an adapter which has a sound collecting function and a function to input the response information to the two-way broadcast program without use of the remote control commander will now be explained.

The third embodiment provides a receive button 79a, a response button group 79e, an input cancel button 79c and an access start button for starting data transmission through the telephone line 50L, which have been provided in the remote control commander 70 in the second embodiment explained with reference to FIG. 14, in the button group 53 of the adapter 50. Thereby, various operations including reception of the two-way broadcast program information offered as the DTMF signal, input of response information to the two-way broadcast program, and transmission of the response information to the response sending destination in the broadcasting side can be performed in the adapter.

For example, when the access start button mentioned above is depressed, the transmitting time is obtained from the clock circuit comprised in the adapter and it is then transmitted to the response sending destination in the broadcasting side after it is added to the response information. Therefore, operations explained with reference to FIG. 8 to FIG. 13 can all be performed in the adapter 50.

Thereby, it is possible for users to enjoy the two-way broadcast program without use of the remote control commander in the area where the voices outputted from the television receiver can be collected. In this embodiment, since the remote control commander is no longer used, transmission of information using the remote control signal to the adapter from the remote control commander can be eliminated. Accordingly, a series of operations from input of the response information to the transmission thereof can be done quickly and any trouble which may appear between the remote control commander and the adapter such as no reception of the remote control signal by the adapter can be prevented.

Furthermore, it is also possible that the response information is transmitted simultaneously with depression of the response button group provided in the adapter, without providing the access start button to start transmission of the response information to the response sending destination in the broadcasting side.

Figure 17:
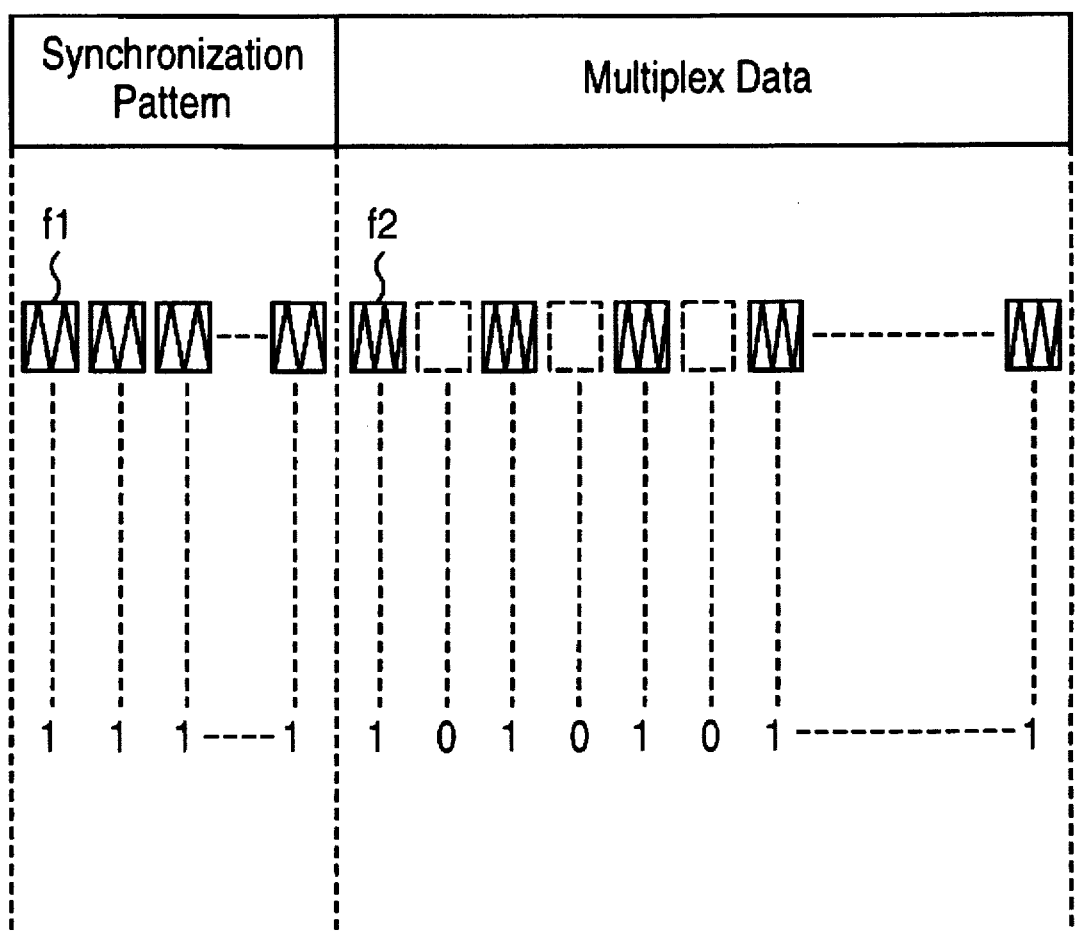
FIG. 17 is a diagram for explaining another embodiment of multiplexing system employed in a broadcast system according to the present invention.

In the first, second and third embodiments explained above, the DTMF signal has been used as the signal to be multiplexed in the principal audio signal of the two-way broadcast program, but the multiplexing method is not limited thereto. The fourth embodiment is an example of such multiplexing method. In this multiplexing method, a synchronization pattern is transmitted before the multiplex data as illustrated in FIG. 17 to detect start of the multiplex data and to establish clock synchronization of the multiplex data. In this embodiment, the tone bursts of the predetermined frequencies are respectively used for the synchronization pattern and multiplex data.

The receiving side detects that the synchronization signal is immediately followed by the multiplex data by detecting the synchronization pattern having the particular pattern as described above. Thereby, data can be extracted easily.

As illustrated in FIG. 17, the synchronization pattern is formed by repeating the frequency f1, for example, the tone burst of 440 Hz for predetermined number of times in the predetermined period t1. When the synchronization pattern is detected in the receiving side, it is also detected that the data is multiplexed immediately after the synchronization pattern. The data is transmitted, in this embodiment, by multiplexing the frequency f2 different from the frequency f1, for example, the tone burst of 1200 Hz with the predetermined period t2. The periods t1 and t2 are set equally in this embodiment. In the receiving side, a clock synchronized with the period t1 obtained by detection of the synchronization pattern is generated and data can be extracted by detecting existence of the multiplexed tone burst of the frequency f2 depending on this clock.

As illustrated in the multiplex data of FIG. 17, the rectangular shapes indicated by a solid line means the areas where the tone burst of frequency 12 is multiplexed, while the rectangular shapes indicated by a dotted line means the areas where the tone burst is not multiplexed. Existence of tone burst of frequency f2 is designated as logic "1" while no-existence of tone burst is designated as logic "0" and thereby a binary data can be decoded.

In this embodiment, the tone burst of the frequency f1 is repeated for the predetermined number of times to form the synchronization pattern, but there is no limitation on this pattern so long as such pattern is never erroneously detected as voices existing in the natural world. In addition, the tone burst of the predetermined frequency may also be multiplexed continuously for such a predetermined short period as not existing actually.

As the multiplex data, a binary data is used in this embodiment, but it is also possible to multiplex the data as the multi-level data by assigning, for example, a level to particular frequency in such a manner that "1" is designated to the frequency f1, "2" to the frequency f2 and "3" to the frequency f3. In this case, the frequency and period which may not be erroneously detected as voices existing in the natural world can also be multiplexed for transmission in the principal audio signal of the broadcast signal as the data as in the case of the synchronization pattern. Such data can also be extracted accurately in the receiving side.

In above embodiment, the period of multiplexing data is set equal to that of the synchronization pattern so that such period can easily be detected in the receiving side. But it is also possible to execute the multiplexing in synchronization with the synchronization pattern with the period equal to an integer times of the period of the synchronization pattern.

In above embodiments 1, 2 and 3, a television broadcast is considered but the present invention can also be implemented to a radio broadcast and moreover can be applied without relation to the television broadcasting systems such as NTSC, BS, CS, MUSE, etc. This is also applied to the fourth embodiment.

Moreover, in above embodiments 1, 2 and 3, the response information is returned through the telephone line but it can naturally be sent through a cable of the cable television system as well as the telephone line.

What is claimed is:

1. A method for operating a two-way broadcasting system, comprising the steps of:

transmitting a broadcast signal, from a transmitting side, where two-way broadcast program information is multiplexed under the condition that said two-way broadcast program information can be separated from a principal audio signal of a relevant broadcast program and said two-way broadcast program information can then be reproduced as audible sound in a receiving side; and receiving said broadcast signal, in said receiving side, outputting a reproduced voice signal including said two-way broadcast program information from a loud speaker system, displaying a guidance message representing operating instructions to a user, selectably energizing a microphone for collecting voices outputted from said speaker system, extracting said two-way broadcast program information from said collected voice signal for decoding and transmitting a response information to a two-way broadcast program to a predetermined response sending destination through a communication line using said decoded information.

2. A receiving system for a two-way broadcast program wherein two-way broadcast program information is multiplexed under the condition that said two-way broadcast program information can be separated from a principal audio signal of a broadcast program and can be reproduced as an audible sound in a receiving side, comprising:

a two-way broadcast program receiving and reproducing means including display means for displaying a guidance message for instructing a user in operating said receiving system;

a two-way response sending device which is individually provided independent of said two-way broadcast program receiving and reproducing means and is coupled to a communication line;

said two-way response sending device further comprising:

a sound collecting means for collecting voices outputted from said speaker system of said broadcast program receiving and reproducing means;

energizing means for selectably energizing and de-energizing said sound collecting means such that power conservation is realized when said sound collecting means is de-energized:

a decoding means for extracting the two-way broadcast program information multiplexed in the principal audio signal from an output voice signal of said sound collecting means and then decoding said two-way broadcast program information; and a transmitting means for sending said response information to said two-way broadcast program through said communication line using said two-way broadcast program information decoded by said decoding means.

3. A receiving system depending on claim 2, wherein said two-way response sending device comprises a remote control commander and an adapter, wherein said remote control commander includes said sound collecting means and said decoding means; and said adapter includes a receiving part for receiving a remote control signal from said remote control commander and said transmitting means coupled to said communication line.

4. A two-way broadcasting system depending on claim 1, wherein said information regarding the two-way broadcast program is multiplexed as the DTMF signal in said principal audio signal.

5. A receiving system depending on claim 3, wherein said information regarding said two-way broadcast program is multiplexed as the DTMF signal in the principal audio signal and said decoding means is a DTMF decoder.

6. An apparatus for responding via telephone line to an inquiry transmitted as part of a television signal, comprising in combination:

a microphone for receiving audible DTMF signals produced by a television set, said television set producing said audible DTMF signals upon decoding of said television signal and further producing a guidance message representing operating instructions to a user;

energizing means for selectably energizing and de-energizing said microphone such that power conservation is realized when said microphone is de-energized;

a DTMF decoder for decoding said DTMF signals to produce a decoded signal; and a modem for transmitting said decoded signal to a remote location via telephone connection; and dialing means for dialing a telephone number decoded from said DTMF signals.

7. A two way broadcast and receiving system, comprising:

a television receiver for producing an audible DTMF signal, wherein information associated with a two way broadcast program is multiplexed to form said DTMF signal, said television receiver further producing a guidance message representing operating instructions to a user;

a remote commander for decoding said DTMF signal to form a first decoded signal, said remote commander further including microphone means for receiving said audible DTMF signal and being selectably energizable and de-energizable such that power conservation is realized when said microphone means is de-energized, said remote commander further including generating means for generating a response signal in response to said first decoded signal; and an adapter coupled to a telephone line, wherein said adapter receives said response signal and forms a second decoded signal used to access a remote location.

8. A system according to claim 7, wherein said television receiver includes a speaker system and said audible DTMF signal is emitted from said speaker system.

9. A system according to claim 7, wherein said remote commander includes a microphone for receiving said audible DTMF signal.

10. A system according to claim 7, wherein said response signal is in the form of an infrared signal.

11. A system according to claim 10, wherein said adapter includes an infrared receiving section for receiving said infrared signal.

12. A system according to claim 7, wherein said adapter includes a modem for transmitting and receiving data through said telephone line.

13. A method for operating a two way broadcasting and receiving system, comprising the steps of:

generating an audible DTMF signal in a television receiver;

displaying a guidance message representing operating instructions to a user;

transmitting said audible DTMF signal from a television receiver to a remote controller;

selectably energizing a microphone in said remote controller for receiving said audible DTMF signal;

generating a reception failure message if said audible DTMF signal is not received after a predetermined time period;

decoding said DTMF signal in said remote controller to form a first decoded signal;

generating a response signal in response to said first decoded signal in said remote controller;

transmitting said response signal to a signal reception section of an adapter coupled by a telephone line to a remote location;

scanning said signal reception section to detect whether or not said response signal is received;

decoding said response signal to form a second decoded signal indicative of said response signal in said adapter;

transmitting said second decoded signal over said telephone line to said remote location;

generating an error indication if said second decoded signal is not transmitted; and selectably de-energizing said microphone such that power conservation is realized when said microphone is de-energized.

14. A system according to claim 13, wherein said television receiver includes a speaker system and said audible DTMF signal is emitted from said speaker system.

15. A system according to claim 13, wherein said response signal is in the form of an infrared signal.

16. A system according to claim 15, wherein said signal reception section is adapted to received said infrared signal.

17. A system according to claim 13, wherein said adapter includes a modem for transmitting and receiving data through said telephone line.

* * * * *